US008526376B2

(12) United States Patent
Nakao et al.

(10) Patent No.: US 8,526,376 B2
(45) Date of Patent: Sep. 3, 2013

(54) RADIO COMMUNICATION MOBILE STATION DEVICE AND RESPONSE SIGNAL SPREAD SEQUENCE CONTROL METHOD

(75) Inventors: Seigo Nakao, Kanagawa (JP); Akihiko Nishio, Kanagawa (JP)

(73) Assignee: Panasonic Corporation, Osaka (JP)

( * ) Notice: Subject to any disclaimer, the term of this patent is extended or adjusted under 35 U.S.C. 154(b) by 244 days.

(21) Appl. No.: 12/739,687

(22) PCT Filed: Oct. 28, 2008

(86) PCT No.: PCT/JP2008/003070
§ 371 (c)(1),
(2), (4) Date: Apr. 23, 2010

(87) PCT Pub. No.: WO2009/057286
PCT Pub. Date: May 7, 2009

(65) Prior Publication Data
US 2010/0232388 A1    Sep. 16, 2010

(30) Foreign Application Priority Data

Oct. 29, 2007   (JP) .................................. 2007-280921

(51) Int. Cl.
*H04W 4/00*    (2009.01)
*H04B 1/00*    (2006.01)
(52) U.S. Cl.
USPC ........... 370/329; 370/343; 370/345; 455/525; 455/561; 375/141; 375/146; 375/260; 375/286; 375/299
(58) Field of Classification Search
USPC ................. 370/345, 329, 316, 203, 260, 343; 455/67.16, 525, 561, 445; 375/299, 260, 375/315, 286, 146, 141
See application file for complete search history.

(56) References Cited

U.S. PATENT DOCUMENTS

| | | | |
|---|---|---|---|
| 2007/0258540 A1* | 11/2007 | Ratasuk et al. | 375/267 |
| 2008/0084853 A1 | 4/2008 | Kuchibhotla | |
| 2008/0304588 A1 | 12/2008 | Pi | |
| 2009/0088148 A1* | 4/2009 | Chung et al. | 455/423 |
| 2009/0103562 A1 | 4/2009 | Frederiksen | |
| 2009/0247174 A1* | 10/2009 | Zhang et al. | 455/450 |
| 2010/0232388 A1* | 9/2010 | Nakao et al. | 370/329 |

OTHER PUBLICATIONS

LG Electronics, "Interleaver Design for CCE-to-RE mapping"; Report R1-073483; 3GPP TSG RAN WG1 Meeting #50; Athens, Greece; Aug. 20-24, 2007, 9 pages.*

(Continued)

Primary Examiner — Benjamin H Elliott, IV
(74) Attorney, Agent, or Firm — Dickinson Wright PLLC

(57) ABSTRACT

Provided is a radio communication mobile station device which can reduce the number of blind decoding processes at a mobile station without increasing the overhead by report information. The device includes: a judgment unit (210) which judges a particular PUCCH to which a response signal corresponding to the downstream line data is to be allocated among a plurality of PUCCH, according to a CCE occupied by PDCCH allocated to a particular search space corresponding to a CCE aggregation size of the PDCCH to which allocation information destined to the local station is allocated among search spaces changing in accordance with the CFI value; and a control unit (211) which controls a cyclic shift amount of a ZAC sequence of the response signal and a block-wise spread code sequence according to a correspondence between CCE occupied by PDCCH allocated to a particular search space and a particular PUCCH resource, the correspondence changing in accordance with the CFI value.

16 Claims, 19 Drawing Sheets

(56) References Cited

OTHER PUBLICATIONS

Mitsubishi Electric; UE and CCE specific scrambling codes for low complexity blind detection of downlink control signaling; Report R1-07341; 3GPP TSG RAN WG1 Meeting #50; Athens, Greece; Aug. 20-24, 2007, 9 pages.*
NEC Group; "DL Control Channel Structure: CCE Aggregation and Blind Detections"; Report R1-073456; 3GPP TSG RAN WG1 Meeting #50; Athens, Greece; Aug. 20-24, 2007, 5 pages.*
Panasonic; "CCE Aggregation size and transport format signaling"; Report R1-073608; 3GPP TSG RAN WG1 Meeting #50; Athens, Greece; Aug. 20-24, 2007, 8 pages.*
Panasonic; "Semi-staic, dynamic, and hybrid CCE aggregation"; Report R1-073609; 3GPP TSG RAN WG1 Meeting #50; Athens, Greece; Aug. 20-24, 2007, 8 pages.*
Huawei; "Relation betwenn UL ACL/NACK and DL CCE"; Report R1-074063; 3GPP TSG-RAN-WG1 #50bis; Shanghai, China; Oct. 8-12, 2007.*
NEC Group; "PUCCH allocation for ACK/NACK transmission"; ; 3GPP TSG RAN WG1 Meeting #50; Athens, Greece; Aug. 20-24, 2007, 4 pages.*
International Search Report dated Feb. 10, 2009.
3GPP TSG-RAN WG1 Meeting #51bis, R1-080130, Panasonic, "PDCCH payload formats, sizes and CCE aggregation," Jan. 14, 2008, pp. 1-6.
3GPP TSG-RAN WG1 Meeting #51bis, R1-080132, Panasonic, "CCE aggregation dependent transport format signaling and padding analysis," Jan. 14, 2008, pp. 1-8.
TSG-RAN WG1 #51Bis, R1-080232, NEC Group, "Downlink Control Channels: CCE Aggregation and Blind Detections," Jan. 14, 2008, pp. 1-4.
3GPP TSG RAN WG1 Meeting #51bis, R1-080235, NEC Group, "Detail on mapping between ACK/NACK index and CCE index," Jan. 14, 2008, pp. 1-4.
3GPP TSG RAN WG1 Meeting #51, R1-074918, Panasonic, "Ordering of the implicit resource allocation table for Uplink ACK/NACK," Nov. 5, 2007, pp. 1-4.
3GPP TSG RAN WG1 Meeting #51, R1-074917, Panasonic, "Ack/Nack repetition and Implicit Resource Allocation for PUCCH," Nov. 5, 2007, pp. 1-2.
3GPP TSG RAN WG1 Meeting #50, R1-073616, Panasonic, "Signaling parameters for UL ACK/NACK resources," Aug. 20, 2007, pp. 1-3.
3GPP TSG RAN WG1 Meeting #50, R1-073621, Panasonic, "Variable Phase Definition of the Reference Signal for CQI in PUCCH," Aug. 20, 2007, pp. 1-5.
3GPP TSG RAN1#50bis, R1-073996, Motorola, "Search Space Definition: Reduced PDCCH Blind Detection for Split PDCCH Search Space," Oct. 8, 2007, pp. 1-4. p. 3, line 5.
3GPP TSG RAN WG1 Meeting #50, R1-073620, Panasonic, "Clarification of Implicit Resource Allocation of Uplink ACK/NACK Signal," Aug. 20, 2007, pp. 1-2. p. 3, line 8.
Ericsson, "Begin-end representation of scheduling allocations," Report R1-073052, 3GPP TSG RAN WG1 Meeting #49bis, Orlando, Florida, Jun. 25-29, 2007, 2 pages.
Nokia, Nokia Siemens Networks, "Considerations on the CCE sharing for uplink and downlink allocation grants," R1-074320, 3GPP TSG RAN WG1 Meeting #50bis, Shanghai, China, Oct. 8-12, 2007, 2 pages.
Panasonic, "Clarification of Implicit Resource Allocation of Uplink ACK/NACK Signal," Report R1-073620, 3GPP TSG RAN WG1 Meeting #50, Athens, Aug. 20-24, 2007, 2 pages.
Extended European Search Report dated Apr. 13, 2011, for corresponding European Application No. EP 08845022.6, 1 page.
International Search Report, mailed Nov. 25, 2008, issued in corresponding International Application No. PCT/JP2008/003067, filed Oct. 28, 2008.
Motorola, "Search Space Definition for L1/L2 Control Channels," [Online] vol. R1-073373, No. 50, Aug. 20, 2007, pp. 1-11, XP002512720, URL: http://www.3gpp.org/ftp/tsg_ranNVG1_RL1/TSGR1_50/Docs/R1-073373.zip, retrieved on Jan. 29, 2009.
NTT DoCoMo, "PDCCH Allocation Based on Hashing Function Generation Method for PDCCH Blind Decoding," Report R1-081406, 3rd Generation Partnership Project (3GPPTM) TSG RAN WG1 Meeting #52bis, Shenzhen, China, Mar. 31-Apr. 4, 2008, pp. 1-4.

* cited by examiner

| CCE AGGREGATION SIZE | STARTING LOCATION (CCE NUMBER) | SEARCH SPACE LENGTH (NUMBER OF CCE'S) |
| --- | --- | --- |
| 1 | 0 | 10 |
| 2 | 4 | 12 |
| 4 | 8 | 16 |
| 8 | 16 | 16 |

FIG.3

| CCE AGGREGATION SIZE | STARTING LOCATION (CCE NUMBER) | SEARCH SPACE LENGTH (NUMBER OF CCE'S) |
| --- | --- | --- |
| 1 | 0 | 6 |
| 2 | 2 | 8 |
| 4 | 4 | 20 |
| 8 | 8 | 24 |

CYCLIC SHIFT VALUES OF ZAC SEQUENCES (0~11)

| CCE #0 | | CCE #4 |
| | CCE #8 | |
| CCE #10 | | CCE #12 |
| | CCE #14 | |
| CCE #15 | | CCE #16 |
| | CCE #17 | |
| CCE #18 | | CCE #19 |
| | CCE #20 | |
| CCE #21 | | CCE #22 |
| | CCE #23 | |

BLOCK-WISE SPREADING CODE
SEQUENCES
(0~2)

FIG.17

RADIO COMMUNICATION MOBILE STATION DEVICE AND RESPONSE SIGNAL SPREAD SEQUENCE CONTROL METHOD

TECHNICAL FIELD

The present invention relates to a radio communication mobile station apparatus and response signal spreading sequence control method.

BACKGROUND ART

In mobile communication, ARQ (Automatic Repeat reQuest) is applied to downlink data from a radio communication base station apparatus (hereinafter abbreviated to "base station") to radio communication mobile station apparatuses (hereinafter abbreviated to "mobile stations"). That is, mobile stations feed back response signals representing error detection results of downlink data, to the base station. Mobile stations perform a CRC (Cyclic Redundancy Check) detection of downlink data, and, if CRC=OK is found (i.e. if no error is found), feed back an ACK (ACKnowledgement), or, if CRC=NG is found (i.e. if error is found), feed back a NACK (Negative ACKnowledgement), as a response signal to the base station. These response signals are transmitted to the base station using uplink control channels such as PUCCH's (Physical Uplink Control CHannels).

Also, the base station transmits control information for notifying resource allocation results for downlink data and uplink data, to mobile stations. This control information is transmitted to the mobile stations using downlink control channels such as PDCCH's (Physical Downlink Control CHannels). Each PDCCH occupies one or a plurality of CCE's (Control Channel Elements). The base station generates PDCCH's per mobile station, allocates CCE's to be occupied by the PDCCH's according to the number of CCE's required for control information, maps the control information on the physical resources associated with the allocated CCE's, and transmits the results.

For example, in order to satisfy desired received quality, an MCS (Modulation and Coding Scheme) of a low MCS level needs to be set for a mobile station that is located near the cell boundary where channel quality is poor. Therefore, the base station transmits a PDCCH that occupies a larger number of CCE's (e.g. eight CCE's). By contrast, even if the MSC of a high MCS level is set for a mobile station that is located near the center of a cell where channel quality is good, it is possible to satisfy desired received quality. Therefore, the base station transmits a PDCCH that occupies a smaller number of CCE's (e.g. one CCE). Here, the number of CCE's occupied by one PDCCH is referred to as "CCE aggregation size."

Also, a base station allocates a plurality of mobile stations to one subframe and therefore transmits a plurality of PDCCH's at the same time. In this case, the base station transmits control information including CRC bits scrambled by the mobile station ID numbers of the destination, so that the destination mobile station of each PDCCH can be identified. Further, the mobile stations decode CCE's to which PDCCH's may be mapped, and perform CRC detection after descrambling the CRC bits by the mobile station ID numbers of those mobile stations. Thus, mobile stations detect the PDCCH's for those mobile stations by performing blind decoding of a plurality of PDCCH's included in a received signal.

However, if a larger total number of CCE's are present, the number of times a mobile station performs blind decoding increases. Therefore, for the purpose of reducing the number of times a mobile station performs blind decoding, a method of limiting CCE's targeted for blind decoding on a per mobile station basis is studied (see Non-Patent Document 1). With this method, a plurality of mobile stations are grouped, and CCE fields being CCE's targeted for blind decoding are limited on a per group basis. By this means, the mobile station of each group needs to perform blind decoding of only the CCE field allocated to that mobile station, so that it is possible to reduce the number of times of blind decoding. Here, the CCE field targeted for blind decoding by a mobile station is referred to as "search space."

Also, to use downlink communication resources efficiently without signaling to notify PUCCH's for transmitting response signals, from the base station to the mobile stations for transmitting response signals, studies are underway to associate CCE's and PUCCH's on a one-to-one basis (see Non-Patent Document 2). According to this association, each mobile station can decide the PUCCH to use to transmit a response signal from that mobile station, from the CCE associated with the physical resource on which control information for that mobile station is mapped. Therefore, each mobile station maps a response signal from that mobile station on a physical resource, based on the CCE associated with the physical resource on which control information for that mobile station is mapped.

Non-Patent Document 1: 3GPP RAN WG1 Meeting document, R1-073996, "Search Space definition: Reduced PDCCH blind detection for split PDCCH search space", Motorola Non-Patent Document 1: 3GPP RAN WG1 Meeting document, R1-073620, "Clarification of Implicit Resource Allocation of Uplink ACK/NACK Signal", Panasonic

DISCLOSURE OF INVENTION

Problems to be Solved by the Invention

However, if a plurality of mobile stations are grouped and search spaces are set on a per group basis, a base station needs to notify search space information indicating the search space of each mobile station, to each mobile station. Therefore, in the above conventional technique, the overhead increases due to notification information.

It is therefore an object of the present invention to provide a radio communication mobile station apparatus and response signal spreading sequence control method for reducing the number of times a mobile station performs blind decoding, without increasing the overhead by notification information.

Means for Solving the Problem

The radio communication mobile station apparatus employs a configuration having: a receiving section that receives a first control channel which occupies one or a plurality of control channel elements and which is allocated to a specific control channel element field matching a number of control channel elements occupied by the first control channel, among a plurality of control channel element fields that vary depending on a control format indicator value; a deciding section that decides a specific second control channel to which a response signal to downlink data is allocated among a plurality of second control channels, based on the control channel element occupied by the first control channel; and a control section that controls a spreading sequence for the response signal, according to an association which associates the control channel element occupied by the first control channel and a spreading sequence of the specific second control channel and which varies depending on the control format indicator value.

Advantageous Effect of the Invention

According to the present invention, it is possible to reduce the number of times a mobile station performs blind decoding, without increasing the overhead due to notification information.

BRIEF DESCRIPTION OF DRAWINGS

FIG. 3 shows search space information according to Embodiment 1 of the present invention;

FIG. 6 shows search space information according to Embodiment 1 of the present invention (in the case where the cell size is large);

FIG. 14 shows the priority order relating to a use of physical resources associated with PUCCH's according to Embodiment 5 of the present invention;

FIG. 16 shows PUCCH resources according to Embodiment 5 of the present invention (CFI=2);

FIG. 17 shows PUCCH resources according to Embodiment 5 of the present invention (CFI=1);

BEST MODE FOR CARRYING OUT THE INVENTION

Embodiments of the present invention will be explained below in detail with reference to the accompanying drawings. In the following explanation, assume that the total number of CCE's allocated to a PDCCH is 32, from CCE #0 to CCE #31, and the PDCCH CCE aggregation size is one of 1, 2, 4 and 8. Also, if one PDCCH occupies a plurality of CCE's, the plurality of CCE's occupied by the PDCCH are consecutive.

Also, a case will be explained with the following explanation, where ZAC (Zero Auto Correlation) sequences are used in the first spreading of PUCCH's and block-wise spreading code sequences, which are used in spreading in LB (Long Block) units, are used in second spreading. However, in the first spreading, it is equally possible to use sequences that can be separated from each other by different cyclic shift values, other than ZAC sequences. For example, in the first spreading, it is equally possible to use GCL (Generalized Chirp Like) sequences, CAZAC (Constant Amplitude Zero Auto Correlation) sequences, ZC (Zadoff-Chu) sequences, or use PN sequences such as M sequences and orthogonal Gold code sequences. Also, in second spreading, as block-wise spreading code sequences, it is possible to use any sequences that can be regarded as orthogonal sequences or substantially orthogonal sequences. For example, in second spreading, it is possible to use Walsh sequences or Fourier sequences as block-wise spreading code sequences.

Also, in the following explanation, assume that the CCE numbers and the PUCCH numbers are associated. That is, the PUCCH number is derived from the CCE number used for a PDCCH to use to allocate uplink data.

Embodiment 1

Figure 1:
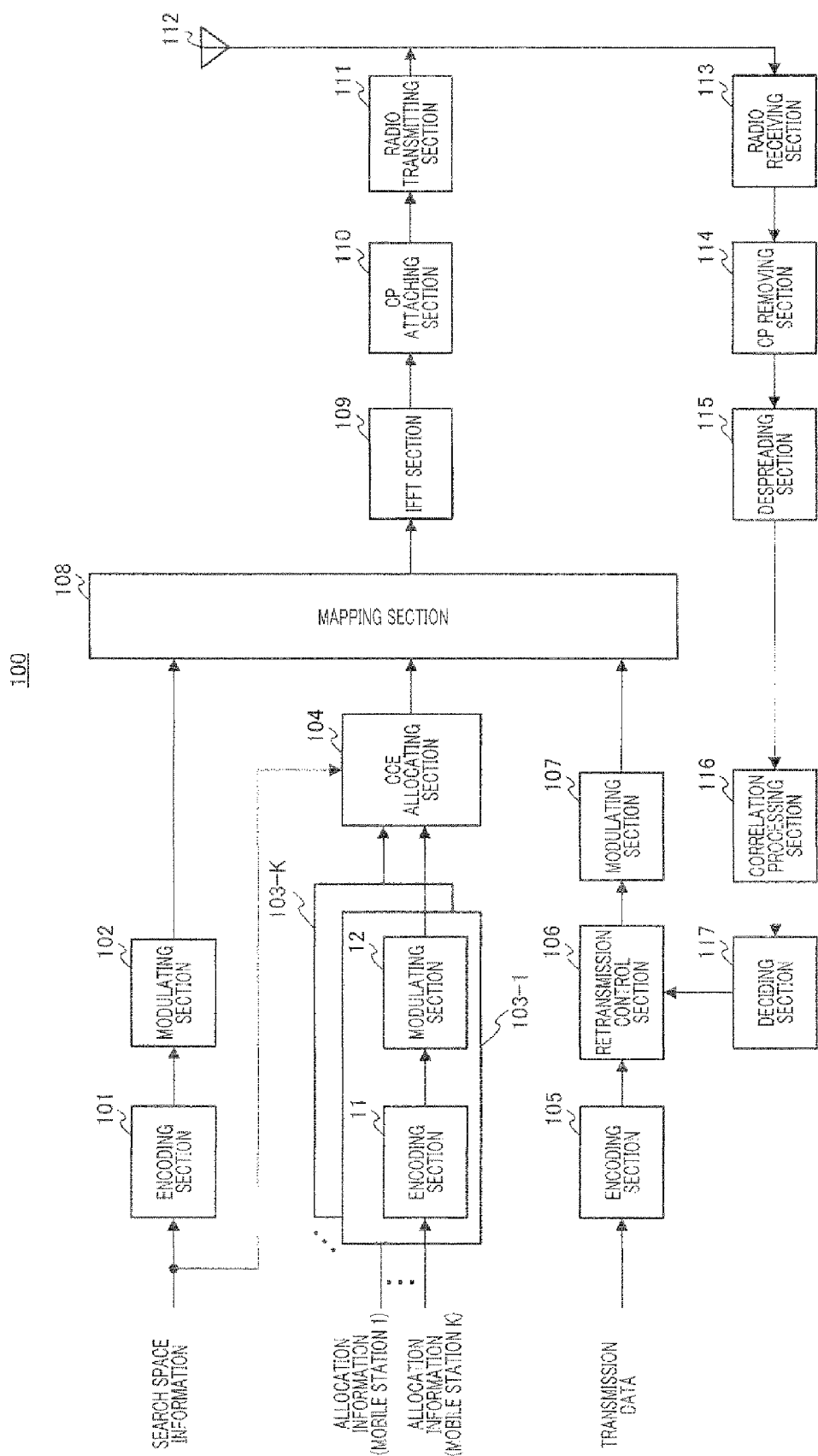
FIG. 1 is a block diagram showing the configuration of a base station according to Embodiment 1 of the present invention.
Figure 2:
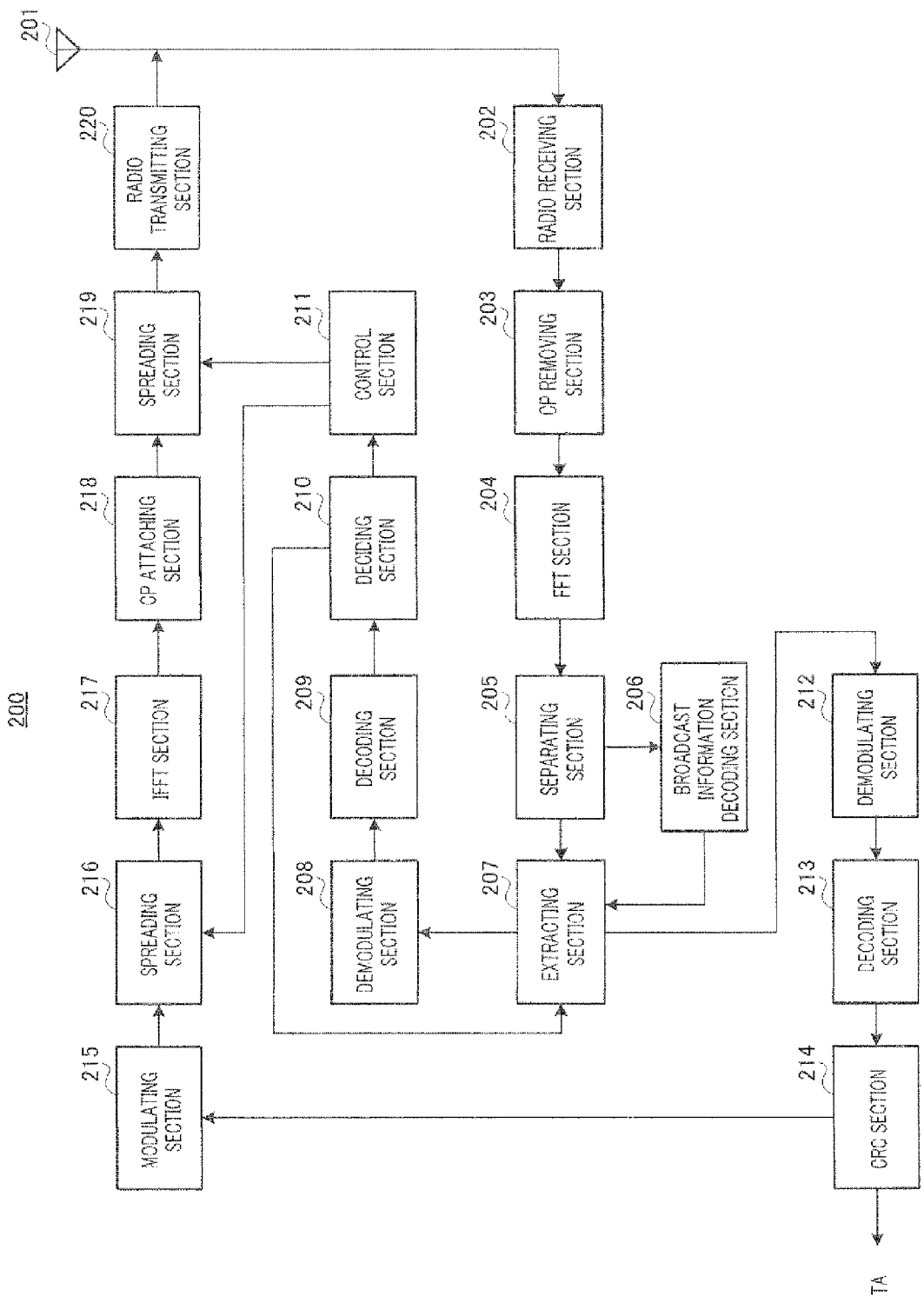
FIG. 2 is a block diagram showing the configuration of a mobile station according to Embodiment 1 of the present invention.

FIG. 1 shows the configuration of base station 100 according to the present embodiment, and FIG. 2 shows the configuration of mobile station 200 according to the present embodiment.

Here, to avoid complicated explanation, FIG. 1 shows components associated with transmission of downlink data and components associated with reception of uplink response signals to downlink data, which are closely related to the present invention, and the illustration and explanation of the components associated with reception of uplink data will be omitted. Similarly, FIG. 2 shows components associated with reception of downlink data and components associated with transmission of uplink response signals to downlink data, which are closely related to the present invention, and the illustration and explanation of the components associated with transmission of uplink data will be omitted.

In base station 100 shown in FIG. 1, encoding section 101 receives as input search space information indicating the definition of a search space determined by, for example, the cell size and base station environment. Further, encoding section 101 encodes the search space information received as input, and outputs the result to modulating section 102. Next, modulating section 102 modulates the encoded search space information received as input from encoding section 101, and outputs the result to mapping section 108.

Encoding and modulating sections 103-1 to 103-K receive as input resource allocation information for uplink data or downlink data directed to mobile stations. Here, each allocation information is allocated to a PDCCH of the CCE aggregation size required to transmit that allocation information. Further, encoding and modulating sections 103-1 to 103-K are provided in association with maximum K mobile stations #1 to #K. In encoding and modulating sections 103-1 to 103-K, encoding sections 11 each encode allocation information received as input and allocated to PDCCH's, and output the results to modulating sections 12. Next, modulating sections 12 each modulate the encoded allocation information received as input from encoding sections 11, and output the results to CCE allocating section 104.

CCE allocating section 104 allocates the allocation information received as input from modulating sections 103-1 to 103-K, to one or a plurality of CCE's based on search space information. To be more specific, CCE allocating section 104 allocates a PDCCH to a specific search space associated with the CCE aggregation size of that PDCCH, among a plurality of search spaces. Further, CCE allocating section 104 outputs allocation information allocated to CCE's, to mapping section 108. Here, the CCE allocating method in CCE allocating section 104 will be described later.

On the other hand, encoding section 105 encodes transmission data (i.e. downlink data) received as input and outputs the result to retransmission control section 106. Here, if there are a plurality items of transmission data for a plurality of mobile stations, encoding section 105 encodes each of the plurality items of transmission data for these mobile stations.

Upon the initial transmission, retransmission control section 106 holds and outputs encoded transmission data of each mobile station to modulating section 107. Here, retransmission control section 106 holds transmission data until an ACK from each mobile station is received as input from deciding section 117. Further, if a NACK from each mobile station is received as input from deciding section 117, that is, upon retransmission, retransmission control section 106 outputs transmission data associated with that NACK to modulating section 107.

Modulating section 107 modulates encoded transmission data received as input from retransmission control section 106, and outputs the result to mapping section 108.

Mapping section 108 maps allocation information to downlink allocation resources associated with the allocated CCE's among downlink resources reserved for PDCCH's, maps search space information to downlink resources reserved for broadcast channels, and maps transmission data to downlink resources reserved for transmission data. Further, mapping section 108 outputs signals to which those channels are mapped, to IFFT (Inverse Fast Fourier Transform) section 109.

IFFT section 109 generates an OFDM symbol by performing an IFFT of a plurality of subcarriers to which allocation information, search space information and transmission data are mapped, and outputs the result to CP (Cyclic Prefix) attaching section 110.

CP attaching section 110 attaches the same signal as the signal at the tail end part of the OFDM symbol, to the head of that OFDM symbol, as a CP.

Radio transmitting section 111 performs transmission processing such as D/A conversion, amplification and up-conversion on the OFDM symbol with a CP, and transmits the result from antenna 112 to mobile station 200 (in FIG. 2).

On the other hand, radio receiving section 113 receives a SC-FDMA (Single-Carrier Frequency Division Multiple Access) symbol transmitted from each mobile station, via antenna 112, and performs receiving processing such as down-conversion and A/D conversion on this SC-FDMA symbol.

CP removing section 114 removes the CP attached to the SC-FDMA symbol subjected to receiving processing.

Despreading section 115 despreads the response signal by the block-wise spreading code sequence used in second spreading in mobile station 200, and outputs the despread response signal to correlation processing section 116.

Correlation processing section 116 finds the correlation value between the despread response signal and the ZAC sequence that is used in the first spreading in mobile station 200, and outputs the correlation value to deciding section 117.

Deciding section 117 detects response signals on a per mobile station basis, by detecting the correlation peaks in the detection windows on a per mobile station basis. For example, upon detecting the correlation peak in detection window #0 for mobile station #0, deciding section 117 detects the response signal from mobile station #0. Further, deciding section 117 decides whether the detected response signal is an ACK or NACK, by synchronization detection using the correlation value of a reference signal, and outputs the ACK or NACK to retransmission control section 106 on a per mobile station basis.

On the other hand, mobile station 200 shown in FIG. 2 receives search space information, allocation information and downlink data transmitted from base station 100. The methods of receiving these items of information will be explained below.

In mobile station 200 shown in FIG. 2, radio receiving section 202 receives an OFDM symbol transmitted from base station 100 (in FIG. 1), via antenna 201, and performs receiving processing such as down-conversion and A/D conversion on the OFDM symbol.

CP removing section 203 removes the CP attached to the OFDM symbol subjected to receiving processing.

FFT (Fast Fourier Transform) section 204 acquires allocation information, downlink data and broadcast information including search space information, which are mapped on a plurality of subcarriers, by performing an FFT of the OFDM symbol, and outputs the results to separating section 205.

Separating section 205 separates broadcast information mapped to resources reserved in advance for broadcast channels, from signals received as input from FFT section 204, and outputs the broadcast information to broadcast information decoding section 206 and information other than the broadcast information to extracting section 207.

Broadcast decoding section 206 decodes the broadcast information received as input from separating section 205 to acquire search space information, and outputs the search space information to extracting section 207.

Assume that extracting section 207 and decoding section 209 receive in advance coding rate information indicating the coding rate of allocation information, that is, information indicating the PDCCH CCE aggregation size.

Also, upon receiving allocation information, extracting section 207 extracts allocation information from the plurality of subcarriers according to the CCE aggregation size and search space information received as input, and outputs the allocation information to demodulating section 208.

Demodulating section 208 demodulates the allocation information and outputs the result to decoding section 209.

Decoding section 209 decodes the allocation information according to the CCE aggregation size received as input, and outputs the result to deciding section 210.

On the other hand, upon receiving downlink data, extracting section 207 extracts downlink data for the subject mobile station from the plurality of subcarriers, according to the resource allocation result received as input from deciding section 210, and outputs the downlink data to demodulating section 212. This downlink data is demodulated in demodulating section 212, decoded in decoding section 213 and received as input in CRC section 214.

CRC section 214 performs an error detection of the decoded downlink data using CRC, generates an ACK in the case of CRC=OK (no error) or a NACK in the case of CRC=NG (error present), as a response signal, and outputs the generated response signal to modulating section 215. Further, in the case of CRC=OK (no error), CRC section 214 outputs the decoded downlink data as received data.

Deciding section 210 performs a blind detection as to whether or not the allocation information received as input from decoding section 209 is directed to the subject mobile station. To be more specific, against the allocation information received as input from decoding section 209, deciding section 210 performs a blind detection as to whether or not the allocation information is directed to the subject mobile station. For example, deciding section 210 decides that, if CRC=OK is found (i.e. no error is found) as a result of demasking CRC bits by the ID number of the subject mobile station, allocation information is directed to that mobile station. Further, deciding section 210 outputs the allocation information directed to the subject mobile station, that is, the resource allocation result of downlink data for that mobile station, to extracting section 207.

Further, deciding section 210 decides a PUCCH that is used to transmit a response signal from the subject mobile station, from the CCE number associated with a subcarrier to which a PDCCH is mapped, where the allocation information directed to that mobile station is allocated to that PDCCH. Further, deciding section 210 outputs the decision result (i.e. PUCCH number) to control section 209. For example, if a CCE associated with a subcarrier to which PDCCH directed to the subject mobile station is mapped is CCE #0, deciding section 210 decides that PUCCH #0 associated with CCE #0 is the PUCCH for that mobile station. Also, for example, if CCE's associated with subcarriers to which PDCCH directed to the subject mobile station is mapped are CCE #0 to CCE #3, deciding section 210 decides that PUCCH #0 associated with CCE #0 of the minimum number among CCE #0 to CCE #3, is the PUCCH for that mobile station.

Based on the PUCCH number received as input from deciding section 210, control section 211 controls the cyclic shift value of the ZAC sequence used in the first spreading in spreading section 216 and the block-wise spreading code sequence used in second spreading in spreading section 219. For example, control section 211 selects the ZAC sequence of the cyclic shift value associated with the PUCCH number received as input from deciding section 210, among twelve ZAC sequences from ZAC #0 to ZAC #11, and sets the ZAC sequence in spreading section 216, and selects the block-wise spreading code sequence associated with the PUCCH number received as input from deciding section 210, among three block-wise spreading code sequences from BW #0 to BW #2, and sets the block-wise spreading code sequence in spreading section 219. That is, control section 211 selects one of the plurality of resources defined by ZAC #0 to ZAC #11 and by BW #0 to BW #2.

Modulating section 215 modulates the response signal received as input from CRC section 214 and outputs the result to spreading section 216.

Spreading section 216 performs first spreading of the response signal by the ZAC sequence set in control section 211, and outputs the response signal subjected to the first spreading to IFFT section 217. That is, spreading section 216 performs first spreading of the response signal using the ZAC sequence of the cyclic shift value associated with the resource selected in control section 211.

IFFT section 217 performs an IFFT of the response signal subjected to the first spreading, and outputs the response signal subjected to an IFFT to CP attaching section 218.

CP attaching section 218 attaches the same signal as the tail end part of the response signal subjected to an IFFT, to the head of that response signal as a CP.

Spreading section 219 performs second spreading of the response signal with a CP by the block-wise spreading code sequence set in control section 211, and outputs the response signal subjected to second spreading to radio transmitting section 220.

Radio transmitting section 220 performs transmission processing such as D/A conversion, amplification and up-conversion on the response signal subjected to second spreading, and transmits the result from antenna 201 to base station 100 (in FIG. 1).

Next, the CCE allocating method in CCE allocating section 104 will be explained in detail.

CCE allocating section 104 allocates PDCCH's directed to mobile stations, to a search space associated with the CCE aggregation size of those PDCCH's to which allocation information for those mobile stations is allocated, among a plurality of search spaces.

Here, as shown in FIG. 3, CCE allocating section 104 receives as input search space information defining the CCE numbers representing the starting locations of search spaces and the numbers of CCE's representing the search space lengths, on a per CCE aggregation size basis. For example, the search space associated with a CCE aggregation size of 1 is defined where the CCE number representing the starting location is CCE #0 and the number of CCE's is 10. Similarly, the search space associated with a CCE aggregation size of 2 is defined where the CCE number representing the starting location is CCE #4 and the number of CCE's is 12. The same applies to the case where the CCE aggregation size is 4 or 8.

Figure 4:
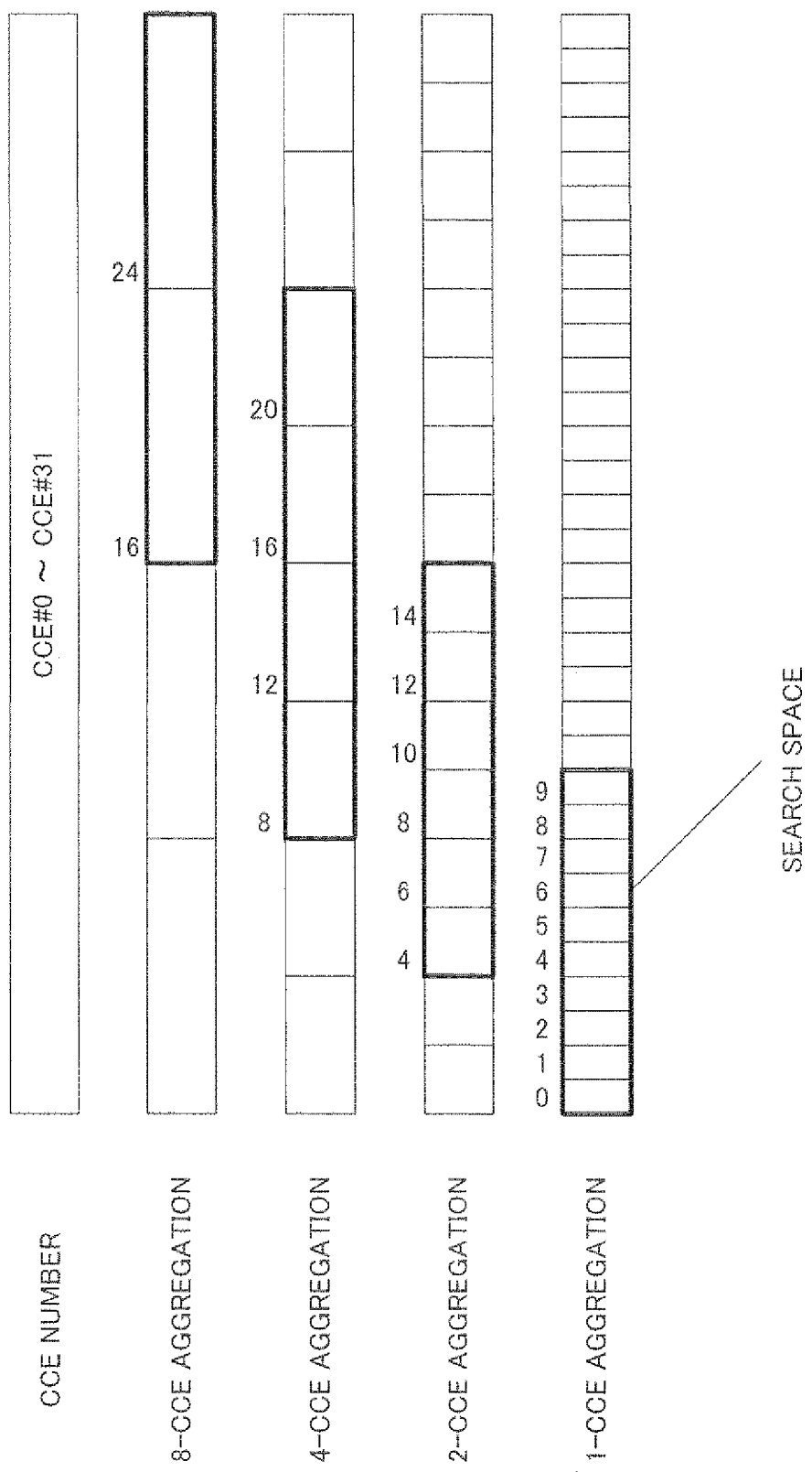
FIG. 4 shows search spaces according to Embodiment 1 of the present invention.

Therefore, as shown in FIG. 4, a search space formed with ten CCE's from CCE #0 to CCE #9 is defined when the CCE aggregation size is 1, a search space formed with twelve CCE's from CCE #4 to CCE #15 is defined when the CCE aggregation size is 2, a search space formed with sixteen CCE's from CCE #8 to CCE #23 is defined when the CCE aggregation size is 3, and a search space formed with sixteen CCE's from CCE #16 to CCE #31 is defined when the CCE aggregation size is 4.

That is, as shown in FIG. 4, CCE allocating section 104 can allocate maximum ten PDCCH's of a CCE aggregation size of 1 to the search space of CCE #0 to CCE #9. Similarly, CCE allocating section 104 can allocate maximum six PDCCH's of a CCE aggregation size of 2 to the search space of CCE #4 to CCE #15, allocate maximum four PDCCH's of a CCE aggregation size of 4 to the search space of CCE #8 to CCE #23, and allocate maximum two PDCCH's of a CCE aggregation size of 8 to the search space of CCE #16 to CCE ∩31.

For example, a case will be explained where CCE allocating section 104 of base station 100 allocates six PDCCH's of a CCE aggregation size of 1, three PDCCH's of a CCE aggregation size of 2, three PDCCH's of a CCE aggregation size of 4 and one PDCCH of a CCE aggregation size of 8.

Figure 5:
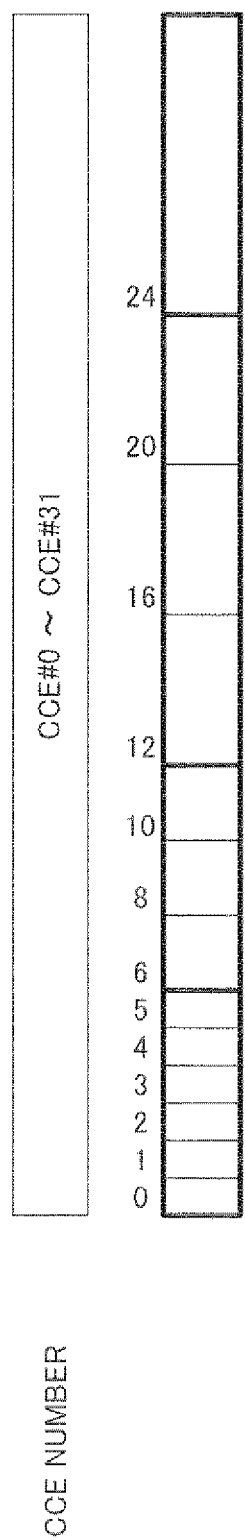
FIG. 5 shows an example of CCE allocation according to Embodiment 1 of the present invention.

First, as shown in FIG. 5, CCE allocating section 104 allocates six PDCCH's (of a CCE aggregation size of 1) to CCE #0 to CCE #5 in the search space (CCE #0 to CCE #9) associated with a CCE aggregation size of 1 shown in FIG. 4. Next, as shown in FIG. 5, CCE allocating section 104 allocates three PDCCH's (of a CCE aggregation size of 2) to CCE's #6 and #7, CCE's #8 and #9 and CCE's #10 and #11, to which PDCCH's of a CCE aggregation size of 1 are not allocated, in the search space (CCE #4 to CCE #15) associated with a CCE aggregation size of 2 shown in FIG. 4. Further, as shown in FIG. 5, CCE allocating section 104 allocates three PDCCH's (of a CCE aggregation size of 4) to CCE's #12 to #15, CCE's #16 to #19 and CCE's #20 to #23, to which PDCCH's of CCE aggregation sizes of 1 and 2 are not allocated, in the search space (CCE #8 to CCE #23) associated with a CCE aggregation size of 4 shown in FIG. 4. Further, as shown in FIG. 5, CCE allocating section 104 allocates one PDCCH (of a CCE aggregation size of 8) to CCE's #24 to #31, to which PDCCH's of CCE aggregation sizes of 1, 2 and 4 are not allocated, in the search space (CCE #16 to CCE #31) associated with a CCE aggregation size of 8 shown in FIG. 4.

Mobile station 200 performs demodulation, decoding and blind detection of PDCCH's using the definition of search spaces based on the CCE aggregation sizes. By this means, it is possible to reduce the number of times of blind detection in demodulating section 208, decoding section 209 and deciding section 210 of mobile station 200 (in FIG. 2). To be more specific, if blind detection is performed presuming that the CCE aggregation size is 1, extracting section 207 outputs only signals associated with CCE #0 to CCE #9 to demodulating section 208 among CCE #0 to CCE #31 shown in FIG. 4. That is, in demodulating section 208, decoding section 209 and deciding section 210, when a CCE aggregation size is 1, the target of blind detection is limited to the search space supporting CCE #0 to CCE #9. Similarly, if blind detection is performed when the CCE aggregation size is 2, extracting section 207 outputs only signals associated with CCE #4 to CCE #15 to demodulating section 208 among CCE #0 to CCE #31 shown in FIG. 4. The same applies to the case where the CCE aggregation size presumes 4 or 8.

Thus, each mobile station performs blind decoding using search spaces associated with the CCE aggregation sizes. That is, by defining one search space information per cell, mobile stations can perform blind decoding unless a base station notifies search space information to these mobile stations.

Here, to reduce degradation of error rate performance of allocation information, the MCS of allocation information directed to mobile stations that are located near a cell edge is set lower. Therefore, the PDCCH CCE aggregation size for mobile stations that are located near a cell edge increases. For example, out of the CCE aggregation sizes 1, 2, 4 and 8, the CCE aggregation size for mobile stations that are located near a cell edge is 4 or 8.

Also, in a cell of a larger cell size, the proportion of mobile stations requiring transmission of allocation information with a low MCS set, that is, the proportion of mobile stations, to which PDCCH's of a larger CCE aggregation size are allocated, increases. In other words, in a cell of a smaller cell size, the proportion of mobile stations that can transmit allocation information with a high MCS set, that is, the proportion of mobile stations, to which PDCCH's of a smaller CCE aggregation size are allocated, increases.

Therefore, a base station defines search spaces that vary between cell sizes. That is, in a larger cell size, a wider search space is defined for a larger CCE aggregation size, and a narrower search space is defined for a smaller CCE aggregation size. Also, in a smaller cell size, a narrower search space is defined for a larger CCE aggregation size, and a wider search space is defined for a smaller CCE aggregation size.

Also, CCE allocating section 104 allocates control information to a specific search space among a plurality of search spaces defined per cell.

For example, FIG. 6 shows an example of search space information in a cell of a larger cell size than a cell in which the search space information shown in FIG. 3 is set. To be more specific, the search space associated with a CCE aggregation size of 1 is defined where the CCE number representing the starting location is CCE #0 and the number of CCE's is 6. Similarly, the search space associated with a CCE aggregation size of 2 is defined where the CCE number representing the starting location is CCE #2 and the number of CCE's is 8. The same applies to the case where the CCE aggregation size is 4 or 8.

Figure 7:
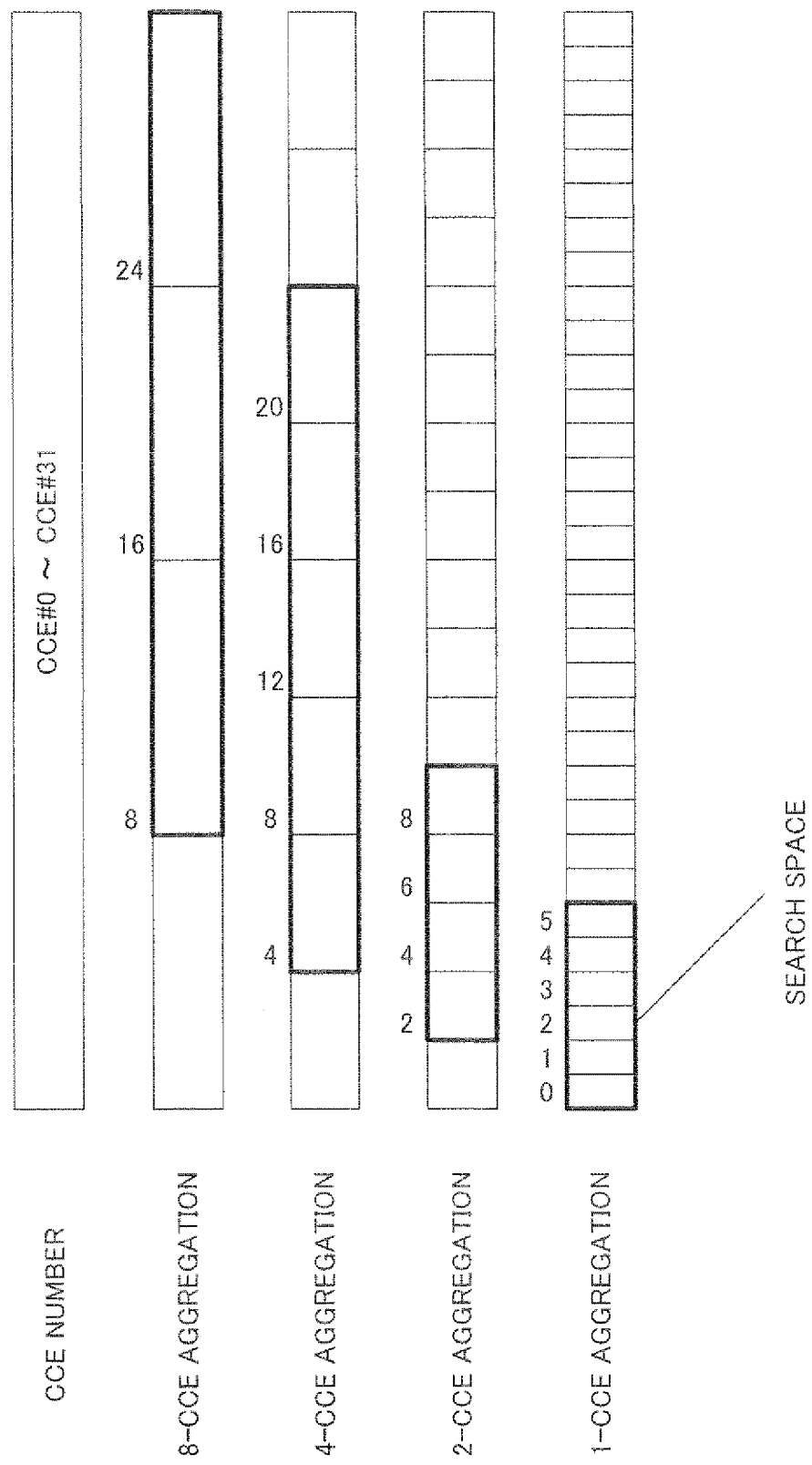
FIG. 7 shows search spaces according to Embodiment 1 of the present invention (in the case where the cell size is large)

That is, as shown in FIG. 7, CCE allocating section 104 can allocate maximum six PDCCH's of a CCE aggregation size of 1 to the search space of CCE #0 to CCE #5. Similarly, CCE allocating section 104 can allocate maximum four PDCCH's of a CCE aggregation size of 2 to the search space of CCE #2 to CCE #9, allocate maximum five PDCCH's of a CCE aggregation size of 4 to the search space of CCE #4 to CCE #23, and allocate maximum three PDCCH's of a CCE aggregation size of 8 to the search space of CCE #8 to CCE #31.

Here, if the search spaces shown in FIG. 7 are compared to the search spaces shown in FIG. 4, in a smaller CCE aggregation size, that is, in a CCE aggregation size of 1 (or a CCE aggregation size of 2), the number of PDCCH's allocated decreases from 10 (6) to 6 (4). By contrast, in a larger CCE aggregation size, that is, in a CCE aggregation size of 4 (or a CCE aggregation size of 8), the number of PDCCH's allocated increases form 4 (2) to 5 (3). That is, in CCE allocating section 104, the number of PDCCH's of a larger CCE aggregation size increases in a larger cell size, so that it is possible to allocate more PDCCH's of a larger CCE aggregation size. In other words, in CCE allocating section 104, the number of PDCCH's of a smaller CCE aggregation size increases in a smaller cell size, so that it is possible to allocate more PDCCH's of a smaller CCE aggregation size.

Thus, according to the present embodiment, only search spaces that are defined per cell are the target of blind decoding in a mobile station, so that it is possible to reduce the number of times to perform blind decoding. Also, mobile stations specify search spaces based on search space information broadcasted for all the mobile stations from a base station, so that new notification information per mobile station is not required. Therefore, according to the present embodiment, it is possible to reduce the number of times of blind decoding, without increasing the overhead due to notification information.

Further, according to the present embodiment, PDCCH's are allocated to a search space associated with the CCE aggregation size. By this means, in a plurality of CCE's, the CCE aggregation size of PDCCH's for use is limited. Therefore, according to the present embodiment, by associating PUCCH's with only CCE's of the minimum numbers among the CCE's forming PDCCH's for use, it is possible to reduce the amount of resources reserved for PUCCH's.

Also, a case has been described above with the present embodiment where PDCCH's of all CCE aggregation sizes can be transmitted to a certain mobile station. However, with the present invention, it is equally possible to determine the CCE aggregation size per mobile station. For example, for a mobile station that is located near a cell edge, channel quality is poor, and, consequently, the ratio of transmission with a lower MCS increases. Therefore, the CCE aggregation size in a mobile station that is located near a cell edge is limited to 4 or 8. Also, for a mobile station that is located near a cell center, channel quality is good, and, consequently, the ratio of transmission with a higher MCS increases. Therefore, the CCE aggregation size of a mobile station that is located near a cell center is limited to 1 or 2. By this means, it is easier to further specify a search space, so that it is possible to further reduce the number of times a mobile station performs blind decoding.

Also, although a case has been described above with the present embodiment where the definition of search spaces is set based on the cell size, with the present invention, it is equally possible to set the definition of search spaces based on, for example, the bias of distribution of mobile stations in a cell.

Embodiment 2

In the search spaces shown in FIG. 4 of Embodiment 1, if an odd number of PDCCH's of a given CCE aggregation size are used, a CCE may arise which cannot be used as a PDCCH of a larger CCE aggregation size than the given CCE aggregation size.

For example, in the search spaces shown in FIG. 4, if five PDCCH's of a CCE aggregation size of 1 are used, CCE #0 to CCE #4 are occupied. In this case, out of PDCCH's of a CCE aggregation size of 2, the PDCCH formed with CCE #4 and CCE #5 cannot be used because CCE #4 is already used. That is, CCE #5 is not used. Similarly, for example, if three PDCCH's of a CCE aggregation size of 4 are used, CCE #8 to CCE #19 are occupied. In this case, out of PDCCH's of a CCE aggregation size of 8, the PDCCH formed with CCE #16 to CCE #23 cannot be used because CCE #16 to CCE #19 are already used. That is, CCE #20 to CCE #23 are not used. Thus, a part of CCE's forming a PDCCH is used by another PDCCH of a different CCE aggregation size, and, consequently, the use efficiency of CCE's becomes poor.

Therefore, according to the present embodiment, allocation information is allocated to a specific search space formed with CCE's of lower CCE numbers in a larger CCE aggregation size.

Figure 8:
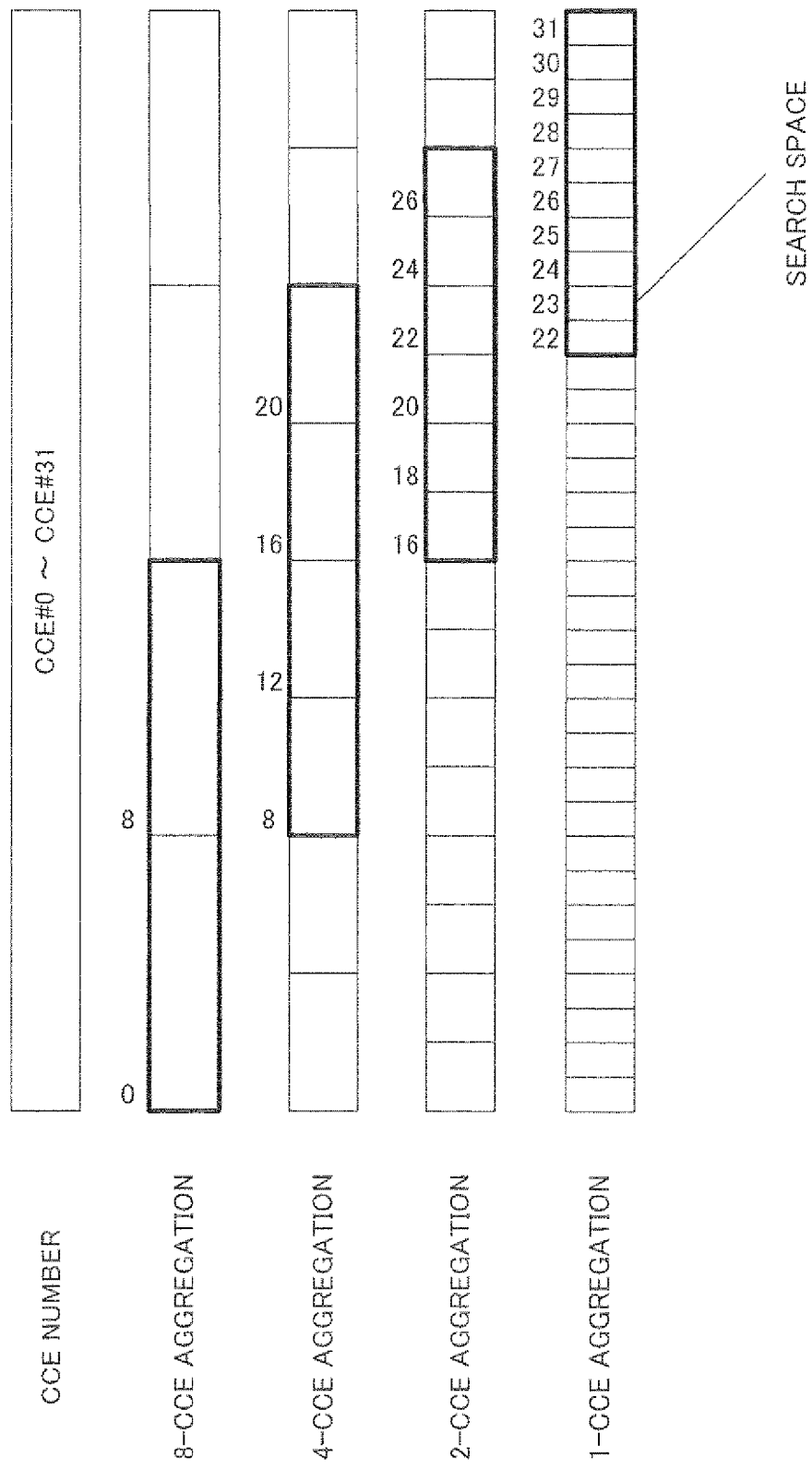
FIG. 8 shows search spaces according to Embodiment 2 of the present invention.

To be more specific, as shown in FIG. 8, a search space formed with sixteen CCE's from CCE #0 to CCE #15 is defined when the CCE aggregation size is 8, a search space formed with sixteen CCE's from CCE #8 to CCE #23 is defined when the CCE aggregation size is 4, a search space formed with twelve CCE's from CCE #16 to CCE #27 is defined when the CCE aggregation size is 2, and a search space formed with ten CCE's from CCE #22 to CCE #31 is defined when the CCE aggregation size is 1.

Here, a case will be explained where CCE allocating section 104 of base station 100 allocates five PDCCH's of a CCE aggregation size of 1, three PDCCH's of a CCE aggregation size of 2, two PDCCH's of a CCE aggregation size of 4 and one PDCCH of a CCE aggregation size of 8.

First, as shown in FIG. 8, CCE allocating section 104 allocates one PDCCH (of a CCE aggregation size of 8) to CCE #0 to CCE #7 in the search space (CCE #0 to CCE #15) associated with a CCE aggregation size of 8. Next, as shown in FIG. 8, CCE allocating section 104 allocates two PDCCH's (of a CCE aggregation size of 4) to CCE's #8 to #11 and CCE's #12 to #15, to which a PDCCH of a CCE aggregation size of 8 is not allocated, in the search space (CCE #8 to CCE #23) associated with a CCE aggregation size of 4. Further, as shown in FIG. 8, CCE allocating section 104 allocates three PDCCH's (of a CCE aggregation size of 2) to CCE's #16 and #17, CCE's #18 and #19 and CCE's #20 and #21, to which PDCCH's of CCE aggregation sizes of 8 and 4 are not allocated, in the search space (CCE #16 to CCE #27) associated with a CCE aggregation size of 2. Further, as shown in FIG. 8, CCE allocating section 104 allocates five PDCCH's (of a CCE aggregation size of 1) to CCE's #22 to #26 in the search space (CCE #16 to CCE #31) associated with a CCE aggregation size of 1. Also, different CCE's from the CCE's used for PDCCH's, that is, unused CCE's are concentrated in CCE numbers (i.e. CCE #27 to CCE #31) near the tail end among CCE #0 to CCE #31.

That is, in CCE allocating section 104, if a plurality of PDCCH's of different CCE aggregation sizes are allocated, it is possible to allocate a plurality of PDCCH's to a plurality of consecutive CCE's without causing unused CCE's. By this means, in each CCE, CCE's are used in order from the CCE of the lowest CCE number, and, if unused CCE's occur, these unused CCE's are likely to be concentrated in CCE numbers near the tail end.

Thus, if CCE's of lower CCE numbers are used in order from PDCCH's of the largest CCE aggregation size, CCE allocating section 104 can allocate PDCCH's of a different CCE aggregation size in order from the CCE immediately after the CCE's to which PDCCH's of a larger CCE aggregation size are allocated. Therefore, unlike Embodiment 1, it is possible to prevent CCE's from being unavailable because PDCCH's of a different CCE aggregation size are already allocated to these CCE's, so that it is possible to allocate PDCCH's efficiently. Also, unused CCE's are concentrated in CCE numbers near the tail end, and, consequently, for example, a base station reduces and transmits the number of CCE's to which PDCCH's are actually allocated (in the above example, CCE's are reduced to 27) and which are transmitted, so that it is possible to use available resources (in the above example, five CCE's from CCE #27 to CCE #31) efficiently as data resources. Also, even if unused CCE's are present in locations other than the locations of CCE numbers near the tail end, although a base station can reduce the number of CCE's to which PDCCH's are allocated and which are transmitted, an enormous amount of control information is necessary to notify which CCE is unused. However, as in the present embodiment, when unused CCE's are concentrated in CCE numbers near the tail end, only the number of CCE's for transmission needs to be notified, so that only a small amount of control information is required.

Thus, according to the present embodiment, allocation information is allocated to a specific search space formed with CCE's of lower CCE numbers in a larger CCE aggregation size. By this means, it is possible to allocate PDCCH's in order from the CCE of the lowest CCE number without causing unused CCE's, and gather unused CCE's in consecutive CCE's of CCE numbers near the tail end. Therefore, according to the present embodiment, it is possible to allocate PDCCH's to CCE's more efficiently than in Embodiment 1 and use unused CCE's efficiently as data resources.

Embodiment 3

A case will be explained with the present embodiment where downlink allocation information and uplink allocation information share a plurality of CCE's.

The method of allocating CCE's in the present embodiment will be explained.

<Allocating Method 1>

With the present embodiment, in a plurality of CCE's forming a specific search space, downlink allocation information for notifying a downlink allocation result is allocated in ascending order from the CCE of the lowest CCE number, and uplink allocation information for notifying an uplink allocation result is allocated in descending order from the CCE of the highest CCE number.

This will be explained below in detail. Here, the same search spaces as those in FIG. 8 of Embodiment 2 will be used. Also, the above will be explained focusing on the case where the CCE aggregation size is 1.

Figure 9:
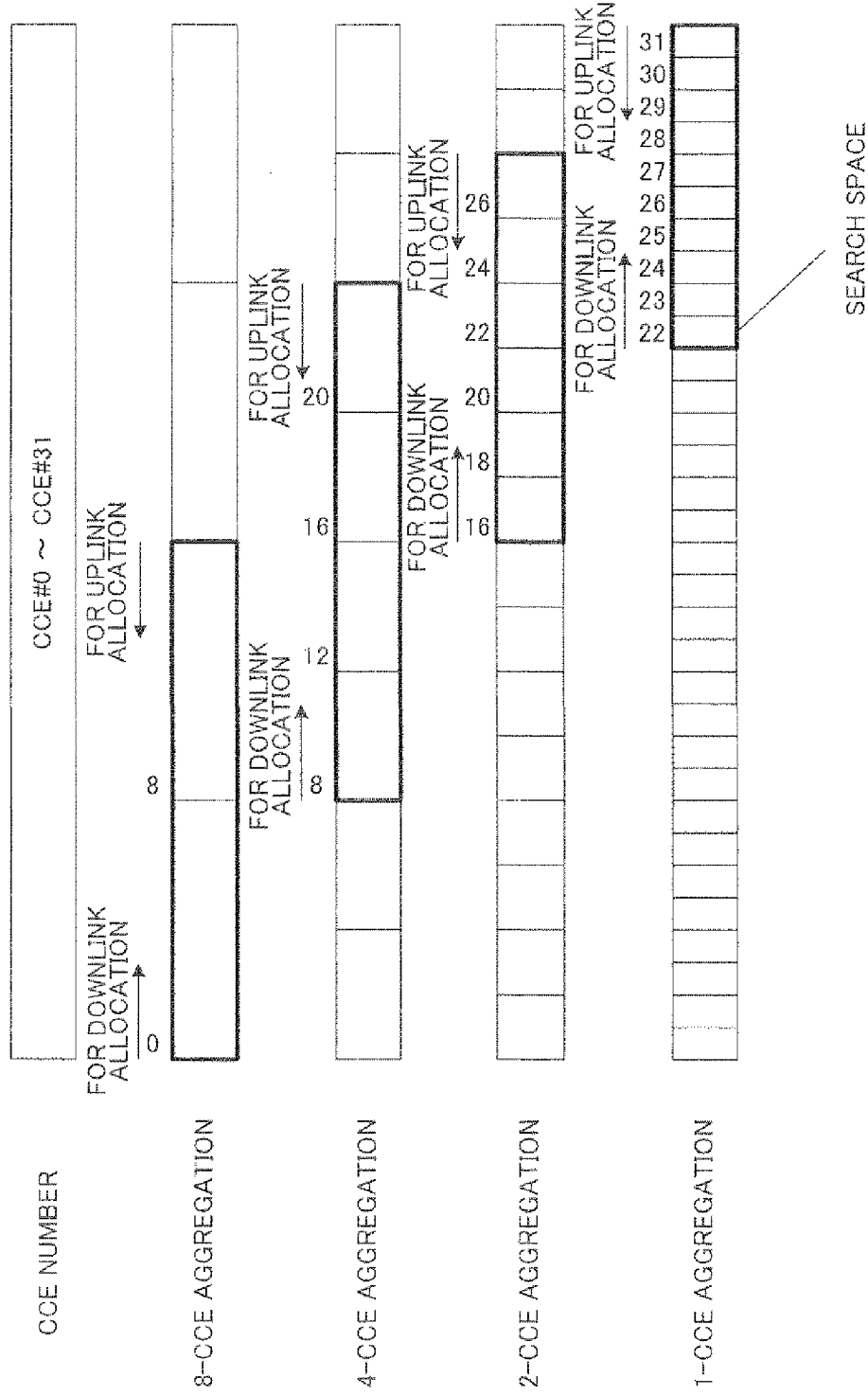
FIG. 9 shows search spaces according to Embodiment 3 of the present invention (in allocating method 1)

As shown in FIG. 9, in the search space (CCE's #22 to #31) matching a CCE aggregation size of 1, CCE allocating section 104 allocates downlink allocation information (of a CCE aggregation size of 1) in ascending order from CCE #22, which is the CCE of the lowest CCE number. That is, CCE allocating section 104 allocates downlink allocation information in order from CCE #22 to CCE #31. By contrast, as shown in FIG. 9, in the search space (CCE's #22 to #31) matching a CCE aggregation size of 1, CCE allocating section 104 allocates uplink allocation information (of a CCE aggregation size of 1) in descending order from CCE #31, which is the CCE of the highest CCE number. That is, CCE allocating section 104 allocates downlink allocation information in order from CCE #31 to CCE #22. The same applies to CCE aggregation sizes of 2, 4 and 8.

In CCE #22 to CCE #31 shown in FIG. 9, CCE #22 is used most frequently as a PDCCH for downlink allocation information, and CCE #31 is used most frequently as a PDCCH for uplink allocation information. In other words, CCE #22 is used least frequently as a PDCCH for uplink allocation information. That is, in CCE #22 to CCE #31 shown in FIG. 9, CCE #22, which is used least frequently as a PDCCH for uplink allocation information, is used as a PDCCH for downlink allocation, and CCE #31, which is used least frequently as a PDCCH for downlink allocation information, is used as a PDCCH for uplink allocation information.

Thus, with the present allocating method, even if downlink allocation information and uplink allocation information share a plurality of CCE's, it is possible to acquire the same effect as in Embodiment 2 and use the plurality of CCE's efficiently between downlink allocation information and uplink allocation information.

Further, a plurality of items of downlink allocation information or a plurality of items of uplink allocation information are not transmitted to a mobile station. Consequently, when a mobile station decides downlink allocation information, by performing blind detection in order from the CCE of the lowest CCE number and stopping blind detection of downlink allocation information at the time the PDCCH for that mobile station is found, it is possible to reduce an average number of times of blind detection, compared to a case where uplink allocation information and downlink allocation information are mapped in a random manner. Therefore, according to the present embodiment, it is possible to reduce the power consumption in mobile stations.

<Allocating Method 2>

With the present allocating method, allocation information is allocated to a search space which is formed symmetrically with CCE's of lower CCE numbers and CCE's of higher CCE numbers in the case of a larger CCE aggregation size.

Figure 10:
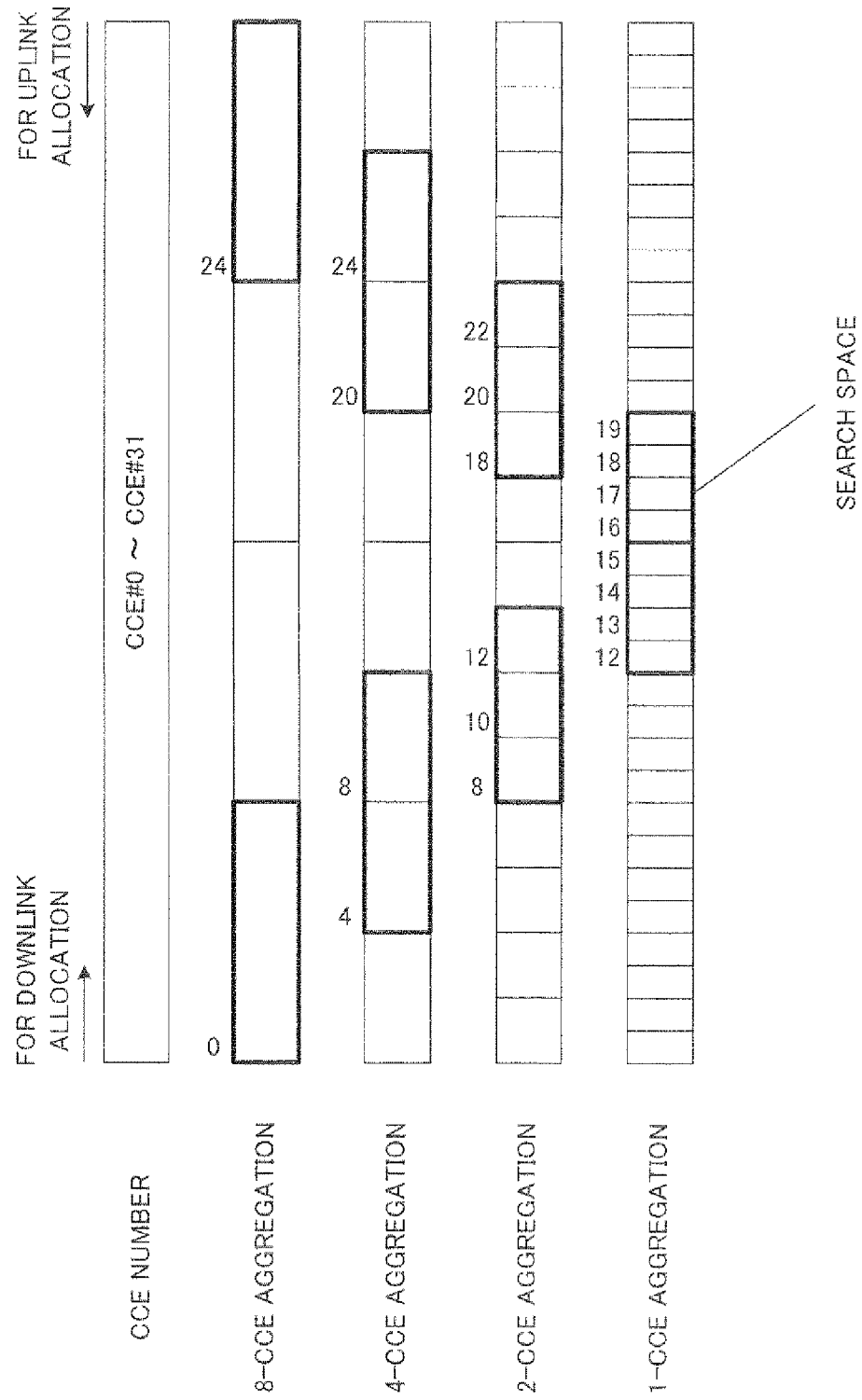
FIG. 10 shows search spaces according to Embodiment 3 of the present invention (in allocating method 2)

This will be explained below in detail. As shown in FIG. 10, search spaces formed with eight CCE's from CCE #0 to CCE #7 and eight CCE's from CCE #24 to CCE #31 are defined when the CCE aggregation size is 8, search spaces formed with eight CCE's from CCE #4 to CCE #11 and eight CCE's from CCE #20 to CCE #27 are defined when the CCE aggregation size is 4, search spaces formed with six CCE's from CCE #8 to CCE #13 and six CCE's from CCE #18 to CCE #23 are defined when the CCE aggregation size is 2, and a search space formed with eight CCE's from CCE #12 to CCE #19 is defined when the CCE aggregation size is 1.

That is, each search space is formed with CCE's symmetrically with reference to the center of CCE #0 to CCE #31 (i.e. between CCE #15 and CCE #16).

Also, as shown in FIG. 10, in the same way as in allocating method 1, CCE allocating section 104 allocates downlink allocation information in ascending order from the CCE of the lowest CCE number in each search space, and allocates uplink allocation information in descending order from the CCE of the highest CCE number in each search space. That is, in CCE #0 to CCE #31 shown in FIG. 10, while the search space (CCE #0 to CCE #15) formed with CCE's of lower CCE numbers than the center of all CCE's is used more frequently as PDCCH's for downlink allocation information, the search space (CCE #16 to CCE #31) formed with CCE's of higher CCE numbers than the center of all CCE's is used more frequently as PDCCH's for uplink allocation information.

Thus, according to the present allocating method, compared to allocating method 1, it is possible to allocate downlink allocation information and uplink allocation information of different CCE aggregation sizes separately, so that it is possible to perform scheduling more easily to optimize allocation of CCE's for downlink allocation information and CCE's for uplink allocation information.

The methods of allocating CCE's have been described above.

Thus, according to the present embodiment, even if downlink allocation information and uplink allocation information share a plurality of CCE's, it is possible to reduce the number of times of blind decoding without increasing the overhead due to notification information.

Also, according to the present embodiment, it is possible to acquire the same effect as above by allocating uplink allocation information in ascending order from the CCE of the lowest CCE number and allocating downlink allocation information in descending order from the CCE of the highest CCE number among a plurality of CCE's forming a specific search space.

Embodiment 4

With the present embodiment, the allocation information is allocated to a specific search space shifted based on the CFI (Control Format Indicator) value.

CFI, which is information indicating the amount of PDCCH resources, is notified from a base station to mobile stations. To be more specific, the CFI value (=3, 2, 1) is associated with the number of OFDM symbols including allocation information. Here, while the above search space information is broadcasted semi-statically from the base station to the mobile stations, CFI is notified dynamically from the base station to the mobile stations on a per subframe basis. That is, OFDM symbols including allocation information vary between subframes dynamically. Consequently, if the definition of search spaces is set based on the number of OFDM symbols including allocation information, that is, based on the total number of CCE's, it is necessary to notify search space information from the base station to the mobile stations every time CFI varies, and therefore the overhead due to notification information increases.

Therefore, with the present embodiment, allocation information is allocated to a specific search space shifted based on the CFI value.

Figure 11:
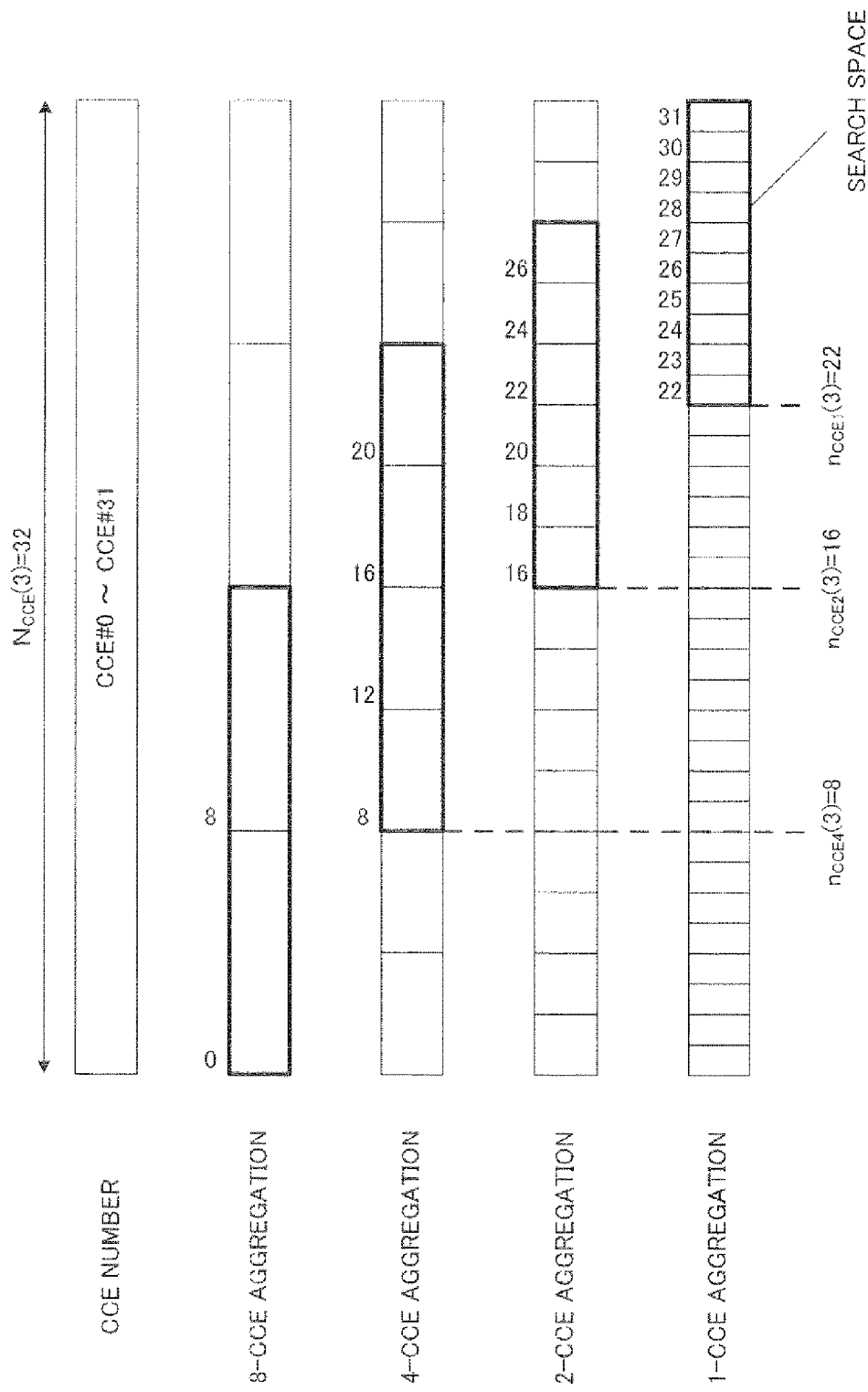
FIG. 11 shows search spaces according to Embodiment 4 of the present invention (CFI=3)

This will be explained below in detail. Here, as shown in FIG. 11, the search space used in the case of CFI=3 is the same as the search space shown in FIG. 8 of Embodiment 2. In this case, as shown in FIG. 11, the total number of CCE's $N_{CCE}(3)=32$ holds. Also, assume that the starting location of the search space is $n_{CCE4}(3)=8$ in the case where the CCE aggregation size is 4, the starting location of the search space is $n_{CCE2}(3)=16$ in the case where the CCE aggregation size is 2 and the starting location of the search space is $n_{CCE1}(3)=22$ in the case where the CCE aggregation size is 1, and these values are broadcasted in advance from a base station to mobile stations.

CCE allocating section 104 calculates the search space in CFI=i (i=1, 2, 3) and changes the definition of the search space based on the following equations.

$$n_{CCE4}(i)=n_{CCE4}(3)-N_{CCE}(3)+N_{CCE}(i)$$

$$n_{CCE2}(i)=n_{CCE2}(3)-N_{CCE}(3)+N_{CCE}(i)$$

$$n_{CCE1}(i)=n_{CCE1}(3)-N_{CCE}(3)+N_{CCE}(i)$$

Here, if the calculation result is negative, the starting location of that search space is CCE #0. In the right member of the above equations, the second term and the third term represent the difference between the total number of CCE's in the subframe of CFI=3 and the total number of CCE's in the subframe of CFI=i. That is, the starting location of the search space matching each CCE aggregation size in the case of CFI=i is shifted forward by the difference of the total number of CCE's from the starting location of the search space matching each aggregation size in the case of CFI=3.

For example, in the case of the subframe of CFI=2, the total number of CCE's $N_{CCE}(2)=24$ holds, and therefore CCE allocating section 104 defines search spaces based on the above equations. To be more specific, the starting location of the search space matching each CCE aggregation size is calculated as follows.

$$n_{CCE4}(2)=n_{CCE4}(3)-N_{CCE}(3)+N_{CCE}(2)=0$$

$$n_{CCE2}(2)=n_{CCE2}(3)-N_{CCE}(3)+N_{CCE}(2)=8$$

$$n_{CCE1}(2)=n_{CCE1}(3)-N_{CCE}(3)+N_{CCE}(2)=14$$

Figure 12:
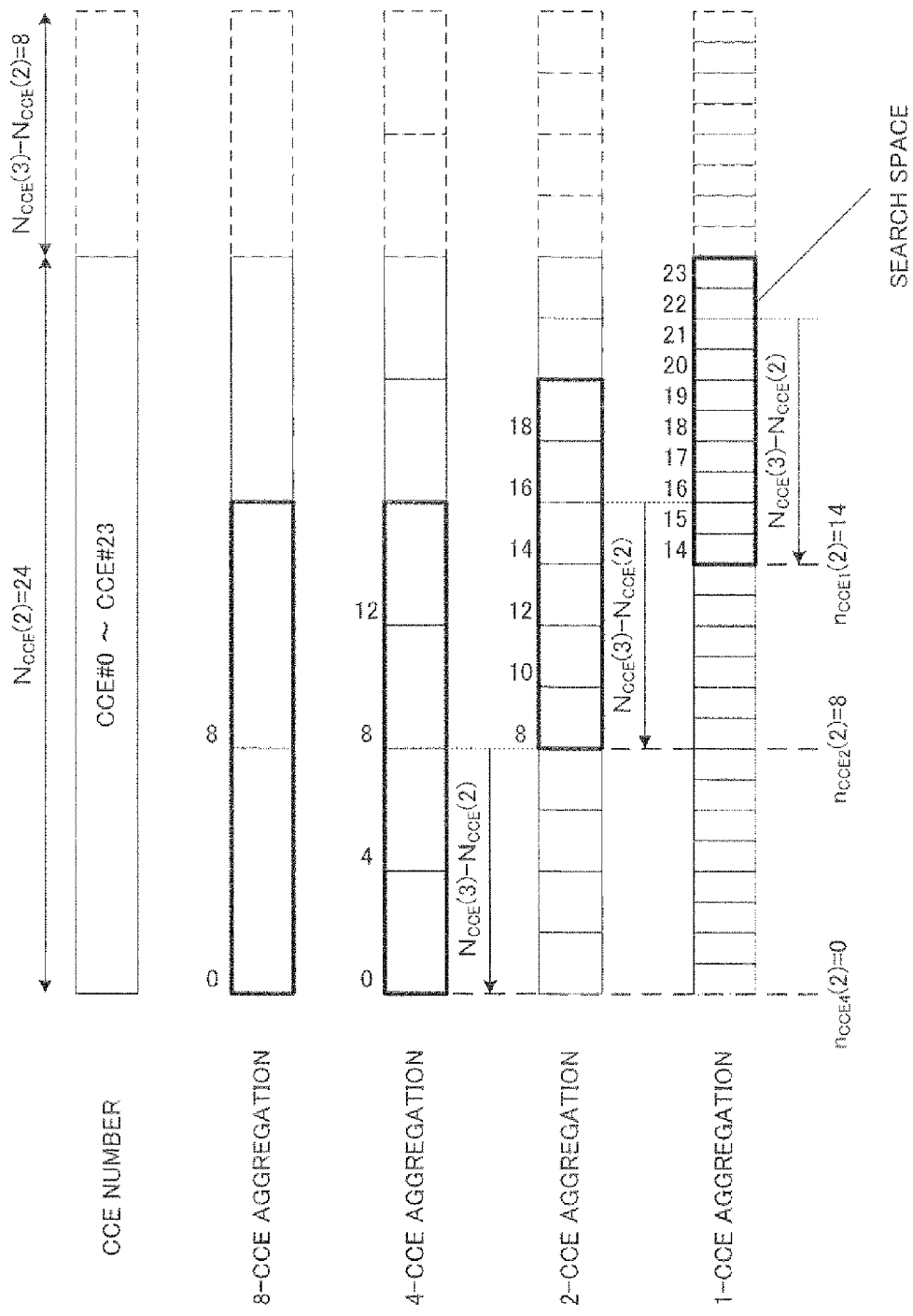
FIG. 12 shows search spaces according to Embodiment 4 of the present invention (CFI=2)
Figure 13:
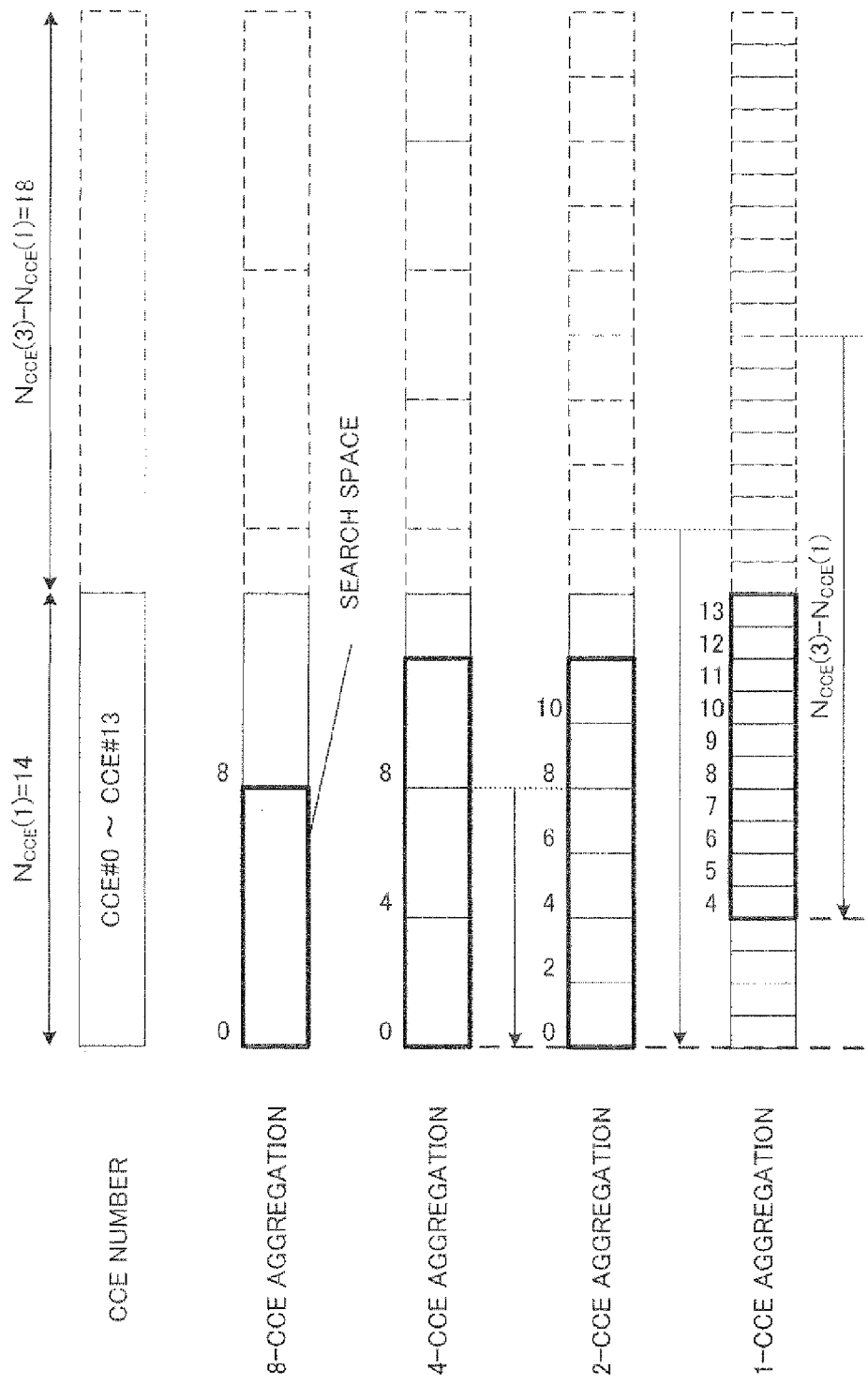
FIG. 13 shows search spaces according to Embodiment 4 of the present invention (CFI=1)

Therefore, CCE allocating section 104 defines the search spaces shown in FIG. 12. That is, the search space matching each CCE aggregation size in the case of CFI=2 is acquired by shifting the CCE numbers by eight CCE's, which are the difference between the total number of CCE's in the case of CFI=3 ($N_{CCE}(3)=32$) and the total number of CCE's in the case of CFI=2 ($N_{CCE}(2)=24$). That is, in CCE allocating section 104, the search spaces are shifted based on the CFI value. Similarly, by calculating the CCE number corresponding to the starting location of the search space matching each aggregation size in the case of CFI=1 (i.e. the total number of CCE's $N_{CCE}(1)=14$), CCE allocating section 104 can acquire the search spaces shown in FIG. 13. Here, in FIG. 13, upon calculating the starting locations $n_{CCE4}(1)$ and $n_{CCE2}(1)$ of the search spaces matching the cases of CCE aggregation sizes of 4 and 2, the calculation results are negative, and therefore the starting locations are $n_{CCE4}(1)=n_{CCE2}(1)=0$.

Also, in the same way as in CCE allocating section 104, deciding section 210 (in FIG. 2) of mobile station 200 performs blind detection of only the allocation information allocated to a specific search space shifted based on the CFI value notified from base station 100, for deciding whether or not that allocation information is the allocation information directed to that mobile station, That is, even if CFI varies, it is possible to find a common definition of search spaces between CCE allocating section 104 of base station 100 and deciding section 210 of mobile station 200.

Thus, according to the present embodiment, even if the CFI value varies, mobile stations can change the definition of search spaces using the definition of search spaces broadcasted from a base station to the mobile stations. By this means, it is possible to form optimal search spaces based on the CFI value without increasing the overhead due to further notification information. Therefore, according to the present embodiment, even if CFI varies, it is possible to acquire the same effect as in Embodiment 1.

Embodiment 5

A case will be explained with the present embodiment where CCE's and PUCCH's are associated.

Upon associating CCE's and PUCCH's, a mobile station decides a PUCCH associated with the lowest CCE number among one or a plurality of CCE's forming the PDCCH to which allocation information for that mobile station is mapped, as the PUCCH for that mobile station. Therefore, if all CCE's are associated with PUCCH's on a one-to-one basis, a PUCCH that is not actually used is found upon CCE aggregation, and, consequently, resource use efficiency degrades. For example, if CCE #0 to CCE #3 are the CCE's associated with physical resources to which allocation information for the subject mobile station is mapped, the mobile station decides PUCCH #0 associated with CCE #0 of the lowest number among CCE #0 to CCE #3, as the PUCCH for that mobile station. That is, three PUCCH's from PUCCH #1 to PUCCH #3 other than the PUCCH for the subject mobile station are not used and are wasted.

Therefore, for example, if the search spaces shown in FIG. 11 of Embodiment 4 are defined, with respect to a plurality of CCE's forming the PDCCH belonging to each search space, a mobile station associates one PUCCH with the number of CCE's matching the CCE aggregation size. For example, one PUCCH is associated with eight CCE's with respect to a plurality of CCE's forming a PDCCH of a CCE aggregation size of 8, and one PUCCH is associated with four CCE's with respect to a plurality of CCE's forming a PDCCH of a CCE aggregation size of 4. That is, with respect to a plurality of CCE's forming a PDCCH of a CCE aggregation size of n, one PUCCH is associated with n CCE's.

However, as described in Embodiment 4, if the CFI value varies per subframe, the range of the search space matching each CCE aggregation size is shifted. By this means, the CCE's forming the PDCCH of each CCE aggregation size vary based on the CFI value, and therefore PUCCH's associated with the CCE's forming the PDCCH of each CCE aggregation size vary. That is, if the CFI value varies, the association between CCE's and PUCCH's is not optimum.

Also, if the association between CCE's and PUCCH resources is notified from a base station to a mobile station every time the CFI value varies, the overhead due to notification information increases.

Therefore, based on the association between CCE's in which downlink allocation information is included and specific PUCCH resources to which a response signal to downlink data is allocated, where the association varies based on the CFI value, the present embodiment controls block-wise spreading code sequences and the cyclic shift values of ZAC sequences for that response signal.

Among a plurality of PUCCH's, deciding section 210 of mobile station 200 (in FIG. 2) according to the present embodiment decides a specific PUCCH to which a response signal to downlink data is allocated, based on CCE's that are occupied by PDCCH's allocated to a specific search space matching the CCE aggregation size of the PDCCH to which allocation information for that mobile station is allocated, among a plurality of search spaces that vary depending on the CFI value as in Embodiment 4.

Control section 211 controls block-wise spreading code sequences and the cyclic shift values of ZAC sequences for a response signal, based on the association between the specific PUCCH decided in deciding section 210, the cyclic shift value of the ZAC sequence and the block-wise spreading code sequence, where the association varies depending on the CFI value.

This will be explained in detail. The present embodiment uses the same search spaces as in FIG. 11 (CFI=3), FIG. 12 (CFI=2) and FIG. 13 (CFI=3) in Embodiment 4. Also, as in Embodiment 4, base station 100 broadcasts search space information ($n_{CCE4}(3)=8$, $n_{CCE2}(3)=16$, $n_{CCE1}(3)=22$) to mobile station 200.

Among a plurality of PUCCH's, control section 211 reserves a PUCCH resource associated with the lowest CCE number occupied by a PDCCH of the smallest CCE aggregation size.

First, the case of CFI=3 will be explained, Among CCE #0 to CCE #31 (CFI=3) shown in FIG. 11, in CCE #0 to CCE #7 immediately before the starting location $n_{CCE4}(3)=8$ (CCE #8) of the search space matching the case of a CCE aggregation size of 4, one PUCCH resource is associated with CCE #0 of the lowest number among the CCE's forming PDCCH's.

Next, as shown in FIG. 11, in CCE #8 to CCE #15 between the starting location $n_{CCE4}(3)=8$ (CCE #8) of the search space matching the case of a CCE aggregation size of 4 and the starting location $n_{CCE2}(3)=16$ (CCE #16) of the search space matching the case of a CCE aggregation size of 2, two PUCCH resources are associated with the CCE's of the lowest numbers CCE #8 and CCE #12 forming two PDCCH's of a CCE aggregation size of 4 that is the smallest CCE aggregation size.

Similarly, as shown in FIG. 11, in CCE #16 to CCE #21 between the starting location $n_{CCE2}(3)=16$ (CCE #16) of the search space matching the case of a CCE aggregation size of 2 and the starting location $n_{CCE1}(3)=22$ (CCE #22) of the search space matching the case of a CCE aggregation size of 1, three PUCCH resources are associated with the CCE's of the lowest numbers CCE #16, CCE #18 and CCE #20 forming three PDCCH's of a CCE aggregation size of 2 that is the smallest CCE aggregation size.

Similarly, as shown in FIG. 11, in CCE #22 to CCE #31 greater than the starting location $n_{CCE1}(3)=22$ (CCE #22) of the search space matching the case of a CCE aggregation size of 1, ten PUCCH resources are associated with CCE #22 to CCE #31 forming ten PDCCH's of a CCE aggregation size of 1.

That is, in the field below the starting location $n_{CCE4}(i)$ of the field corresponding to the CCE's of CFI=i, one PUCCH resource is associated with eight CCE's. Also, in the field equal to or above the starting location $n_{CCE4}(i)$ and below the starting location $n_{CCE2}(i)$, one PUCCH resource is associated with four CCE's. Similarly, in the field equal to or above the starting location $n_{CCE2}(i)$ and below the starting location $n_{CCE1}(i)$, one PUCCH resource is associated with two CCE's. Also, in the field above the starting location $n_{CCE1}(i)$, one PUCCH resource is associated with one CCE.

Thus, based on search space information broadcasted from base station 100, control section 211 controls PUCCH resources for a response signal according to the association between CCE's and PUCCH resources, where the association varies depending on the CFI value.

Figure 14:
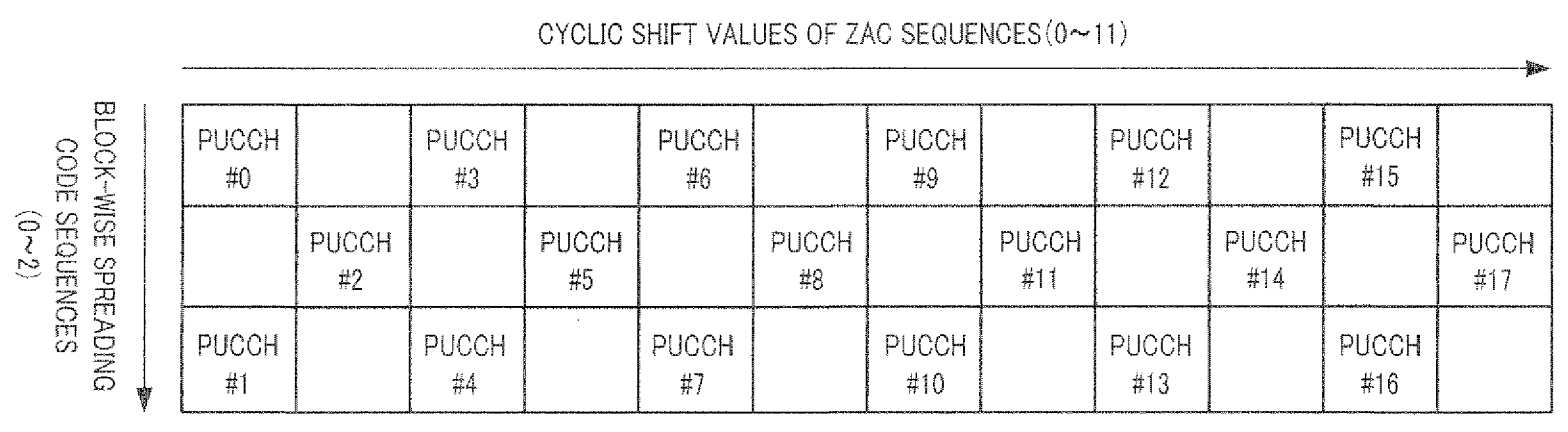
Figure 15:
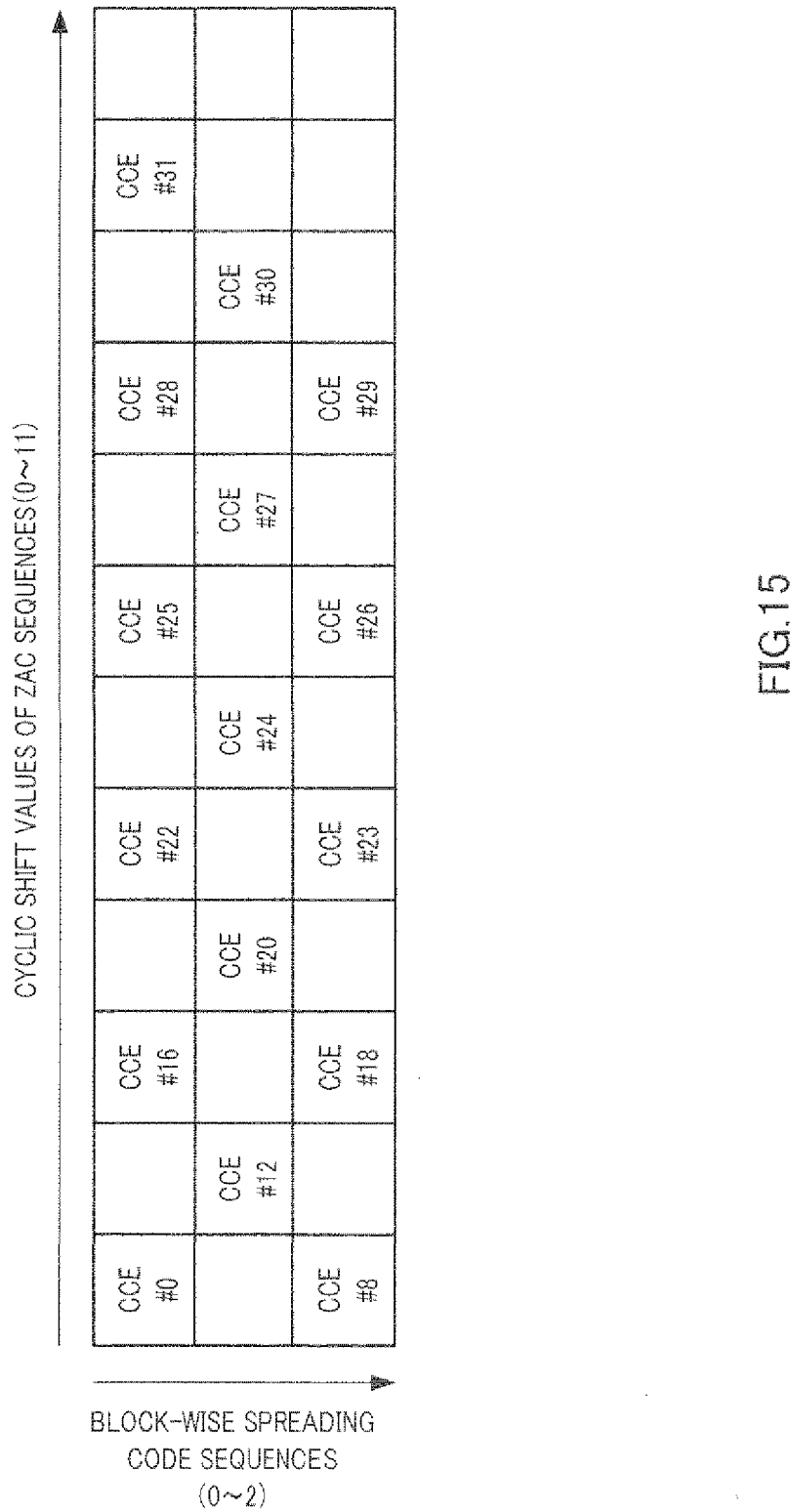
FIG. 15 shows PUCCH resources according to Embodiment 5 of the present invention (CFI=3)

Here, as shown in FIG. 14, assume that the priority order regarding a use of physical resources associated with PUCCH's (i.e. the use order of sequence numbers) is notified in advance from a base station to a mobile station. Here, a physical resource (i.e. PUCCH resource) of a lower PUCCH number is preferentially associated with a CCE. In the association shown in FIG. 14, PUCCH numbers are defined by the cyclic shift values (0 to 11) of ZAC sequences and the sequence numbers (0 to 2) of block-wise spreading code sequences. In this case, PUCCH resources associated with CCE's are as shown in FIG. 15. To be more specific, as shown in FIG. 15, the PUCCH number associated with CCE #0 is defined by ZAC sequence #0 and block wise spreading code sequence #0, and the PUCCH number associated with CCE #8 is defined by ZAC sequence #0 and block-wise spreading code sequence #2. Also, the present invention is not limited to these sequence lengths.

Next, the association between CCE's and PUCCH resources in CFI=2 will be explained.

In the same way as in CFI=3, control section 211 associates a PUCCH resource and the CCE lowest number occupied by the PDCCH of the smallest CCE aggregation size in the search space of CFI=2 among a plurality of PUCCH's.

That is, in the case of CFI=2, as shown in FIG. 12, PUCCH resources are associated with the CCE's of the lowest numbers CCE #0 and CCE #4 forming the PDCCH's of a CCE aggregation size of 4 among CCE #0 to CCE #7, PUCCH resources are associated with the CCE's of the lowest numbers CCE #8, CCE #10 and CCE #12 forming the PDCCH's of a CCE aggregation size of 2 among CCE #8 to CCE #13, and PUCCH resources are associated with CCE #14 to CCE #23 forming PDCCH's of a CCE aggregation size of 1 among CCE #14 to CCE #23.

In this case, PUCCH resources associated with CCE numbers are as shown in FIG. 16. Here, comparing associated PUCCH resources in CFI=3 (in FIG. 15) and associated PUCCH resources in CFI=2 (in FIG. 16), the associated PUCCH resources in CFI=2 shown in FIG. 16 are reduced. Further, the associated CCE numbers are different between the PUCCH resources shown in FIG. 15 and the PUCCH resources shown in FIG. 16.

Thus, according to the present embodiment, even if the CFI value varies, by using search space information broadcasted from a base station, a mobile station can associate CCE's and PUCCH's based on search spaces that vary depending on the CFI value. Further, even if the CFI value varies, by reserving only the minimum PUCCH resources, it is possible to prepare sufficient resources for transmitting response signals.

Figure 17:
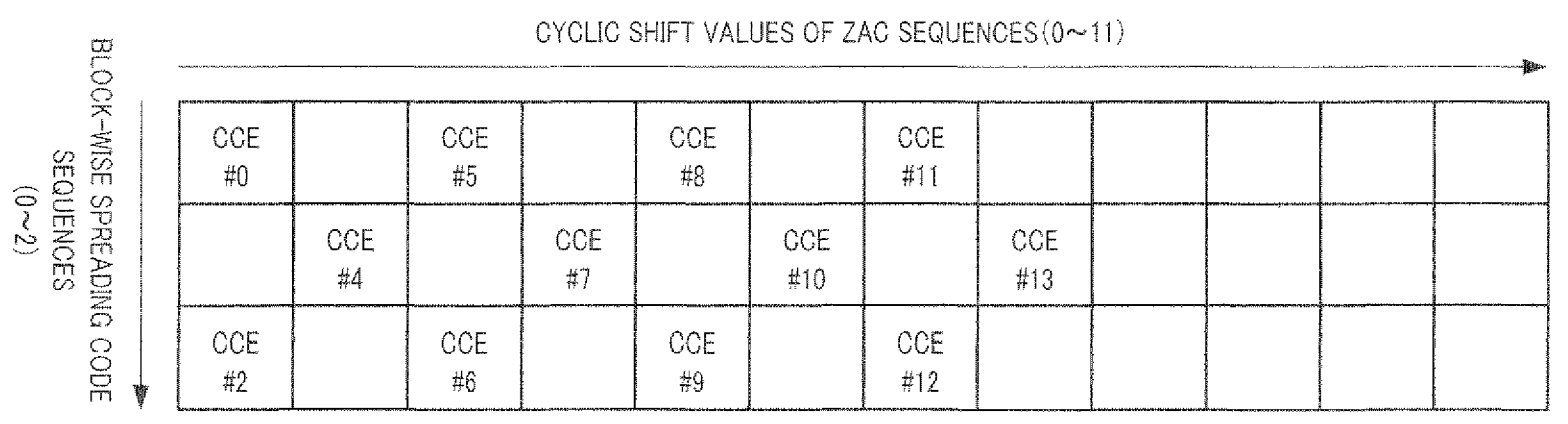

Also, in the same way as in the case of CFI=1, as shown in FIG. 17, control section 211 updates the association between CCE's and PUCCH's.

Thus, according to the present embodiment, based on search space information (about the starting location of the search space matching each CCE aggregation size) in the specific CFI value, a mobile station can associate CCE's and PUCCH resources according to the change of the CFI value. Therefore, according to the present embodiment, even if the CFI value varies, by optimally associating CCE's and PUCCH resources according to the definition of search spaces that varies depending on CFI and reserving only the minimum PUCCH resources, it is possible to prepare sufficient resources for transmitting response signals without notifying, from a base station to mobile stations, the association between CCE's and PUCCH resources every time the CFI value varies.

Also, although a case has been described above with the present embodiment where PUCCH resources are defined based on the association between ZAC sequences and block-wise spreading code sequence shown in FIG. 15, FIG. 16 and FIG. 17, the present invention is not limited to the association between ZAC sequences and block-wise spreading code sequence shown in FIG. 15, FIG. 16 and FIG. 17.

Also, as PUCCH resources, it is possible to use resources other than the cyclic shift values of ZAC sequences and block-wise spreading code sequences. For example, resources that are separated by frequencies such as subcarriers and resources that are separated by time such as SC-FDMA symbols are possible.

Embodiments of the present invention have been described above.

Also, the total number of CCE's that can be used per subframe (i.e. the total number of CCE's that can be present in one subframe) in the above embodiments varies depending on the system bandwidth, the number of OFDM symbols that can be used as CCE's, and the total number of control signals (e.g. ACK/NACK to uplink data) that are not used to notify resource allocation results of downlink/uplink data.

Also, a PUCCH used for explanation in the above embodiments is the channel for feeding back an ACK or NACK, and therefore may be referred to as an "ACK/NACK channel."

Also, although cases have been described above with embodiments where CCE's and PUCCH's (i.e. response signals to downlink data) are associated, the present invention can acquire the same effect as above by associating CCE's and PHICH's (Physical Hybrid ARQ Indicator CHannels). Here, response signals to uplink data are allocated to the PHICH's.

Figure 18:
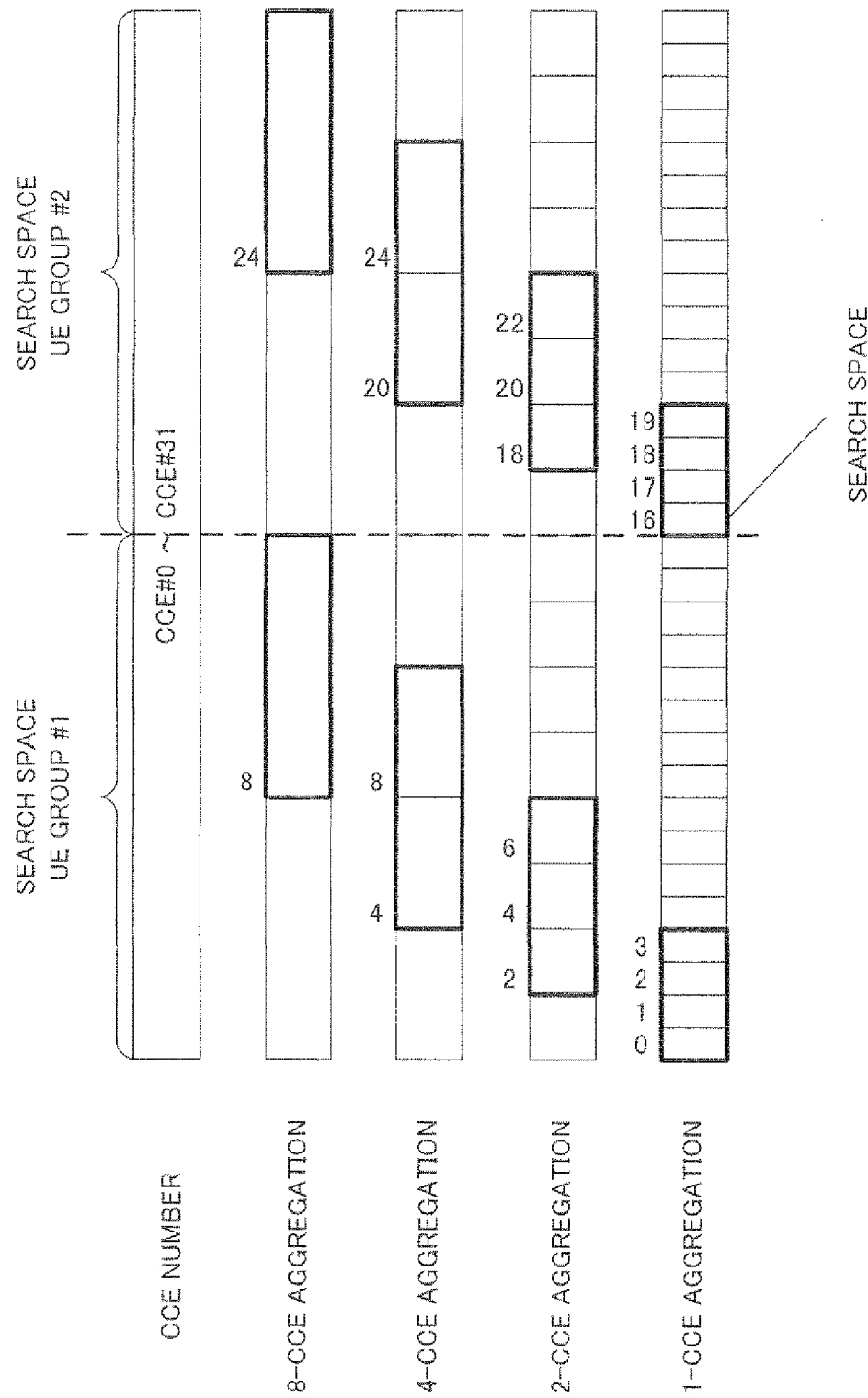
FIG. 18 shows other search spaces (example 1)
Figure 19:
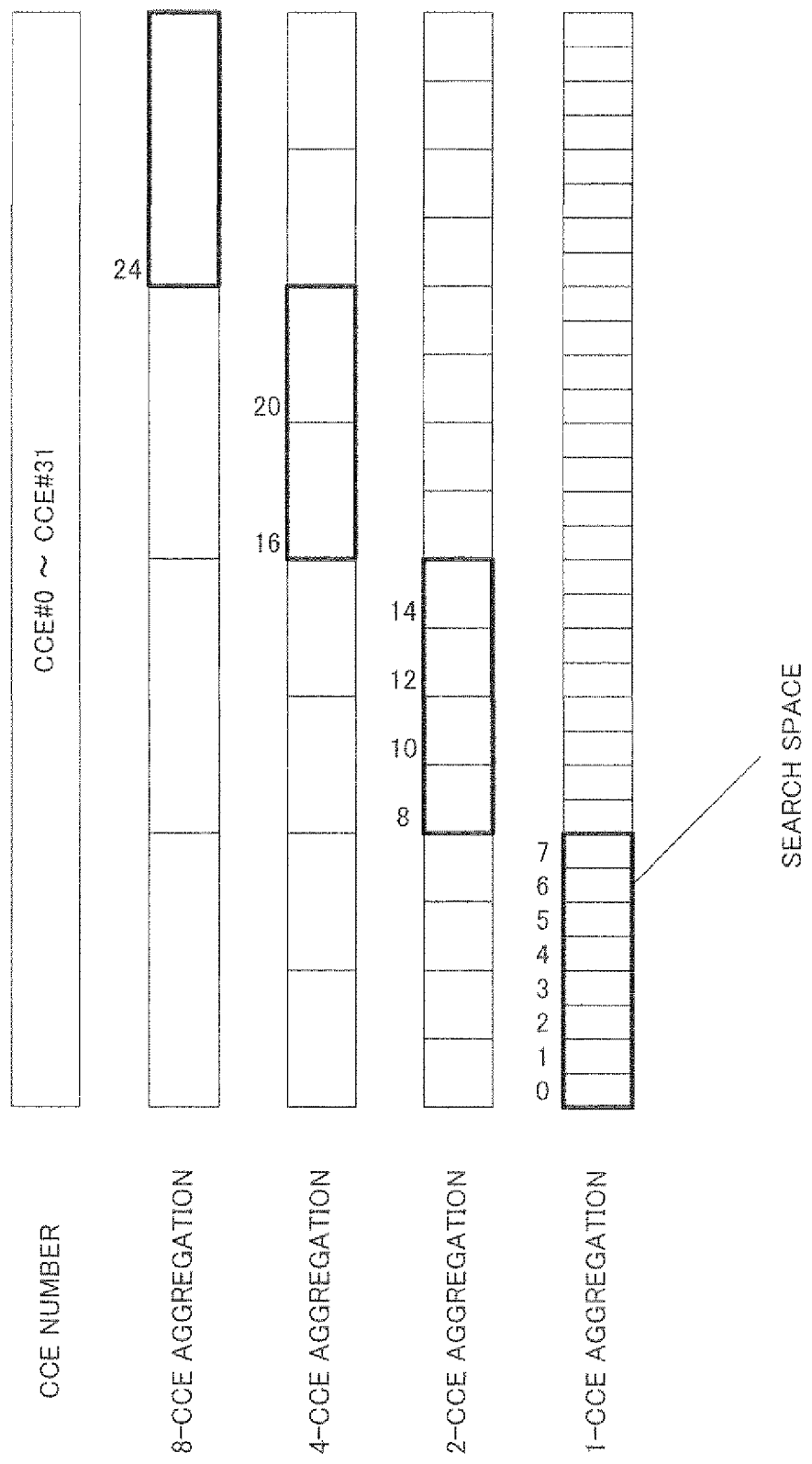
FIG. 19 shows other search spaces (FIG. 2).

Also, even in the case of using the search spaces shown in FIG. 18, it is possible to implement the present invention in the same way as above. FIG. 18 shows grouping a plurality of mobile stations and using the search spaces that are used per group and the search spaces that are used per CCE aggregation size. Thus, even in the case of distributing a plurality of CCE's to a plurality of mobile station groups and applying the present invention to each group, it is possible to acquire the same effect as above. Also, even in the case of using the definition of search spaces shown in FIG. 19, it is possible to implement the present invention in the same way as above. As shown in FIG. 19, a configuration is employed where the search spaces matching respective CCE aggregation sizes do not overlap. By this means, different search spaces do not overlap, so that it is possible to acquire the same effect as above and reduce the resources to reserve for PUCCH resources.

Also, even in the case of feeding back control information other than response signals, it is possible to implement the present invention in the same way as above.

Also, a mobile station may be referred to as a "terminal station," "UE," "MT," "MS" or "STA (STAtion)". Also, a base station may be referred to as "Node B," "BS" or "AP." Also, a subcarrier may be referred to as a "tone." Also, a CP may be referred to as a "GI (Guard Interval)". Also, a CCE number may be referred to as a "CCE index."

Also, the error detecting method is not limited to CRC check.

Also, a method of performing conversion between the frequency domain and the time domain is not limited to IFFT and FFT.

Also, although a case has been described above with the embodiments where signals are transmitted using OFDM as a downlink transmission scheme and SC-FDMA as an uplink transmission scheme, the present invention is equally applicable to the case where transmission schemes other than OFDM and SC-FDMA are used.

Although a case has been described with the above embodiments as an example where the present invention is implemented with hardware, the present invention can be implemented with software.

Furthermore, each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells in an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2007-280921, filed on Oct. 29, 2007, including the specification, drawings and abstract, is incorporated herein by reference in its entirety.

INDUSTRIAL APPLICABILITY

The present invention is applicable to, for example, mobile communication systems.

The invention claimed is:

1. A terminal apparatus comprising:
a deciding section, embodied on a processor, configured to decide a resource index of an uplink control channel to which a response signal to downlink data is mapped; and
a control section configured to determine a sequence, which is used for the response signal, from the decided resource index of the uplink control channel,
wherein:
a downlink control channel is allocated to one or several consecutive control channel element(s) (CCE(s)) in a search space, which is comprised of CCEs corresponding to a plurality of downlink control channel candidates to be attempted to be decoded;
said deciding section decides the resource index of the uplink control channel based on the CCE(s), to which the downlink control channel is allocated; and
the search space for each aggregation size corresponding to a number of the CCE(s), to which the downlink control channel is allocated, is comprised of CCEs that are defined by starting on a CCE with a CCE number, which depends on both a total number of CCEs in a subframe and the aggregation size, and at least part of the search space for the each aggregation size is comprised of CCEs with consecutive CCE numbers.

2. The terminal apparatus according to claim 1, further comprising:
a receiving section configured to receive the downlink control channel, which is transmitted on said one or several consecutive CCE(s) from a base station, wherein:
said deciding section further operates to decode the received downlink control channel in the search space.

3. The terminal apparatus according to claim 1, further comprising:
a transmitting section configured to transmit, to the base station, the response signal on an uplink control channel, an resource index of which is decided based on a CCE number of said one or several consecutive CCE(s), to which the downlink control channel is allocated.

4. The terminal apparatus according to claim 3, wherein said transmitting section transmits the response signal on the uplink control channel, the resource index of which is decided based on a CCE number of the first CCE of said one or several consecutive CCE(s), to which the downlink control channel is allocated.

5. The terminal apparatus according to claim 1, further comprising:
a spreading section configured to spread the response signal with a sequence determined from the resource index of the uplink control channel; and
a transmitting section configured to transmits the spread response signal.

6. The terminal apparatus according to claim 1, wherein the CCE with the CCE number is specific to both the total number of CCEs in the subframe and the aggregation size.

7. The terminal apparatus according to claim 1, wherein the search space comprises a specific number of CCEs according to the aggregation size.

8. The terminal apparatus according to claim 1, wherein the CCE number is different between at least two of the aggregation sizes.

9. The terminal apparatus according to claim 1, wherein a minimum CCE number of the CCEs, of which the search space is comprised, depends on both the total number of CCEs in a subframe and the aggregation size.

10. The terminal apparatus according to claim 1, wherein the search space for the each aggregation size is comprised of the CCEs with CCE numbers, which depend on both the total number of CCEs in a subframe and the aggregation size.

11. The terminal apparatus according to claim 1, wherein each of the search spaces for at least two of the aggregation sizes includes a CCE different from a CCE included in the other of the search spaces.

12. The terminal apparatus according to claim 1, wherein the search spaces for at least two of the aggregation sizes do not overlap in at least part of each of the search spaces.

13. The terminal apparatus according to claim 1, further comprising:
   a receiving section configured to receive a control format indicator (CFI), which indicates a number of symbols used for control channels in a subframe, and the total number of CCEs in the subframe is obtained based on the CFI.

14. The terminal apparatus according to claim 1, wherein the total number of CCEs depends on a system bandwidth, a number of symbols used for control channels and a number of ACK/NACK channels for uplink data.

15. The terminal apparatus according to claim 1, wherein the total number of CCEs is larger than a maximum number of the aggregation size.

16. A method comprising:
   deciding, at a terminal apparatus, a resource index of a uplink control channel to which a response signal to downlink data is mapped; and
   determining a sequence, which is used for the response signal, from the resource index of the uplink control channel,
   wherein:
   a downlink control channel is allocated to one or several consecutive control channel element(s) (CCE(s)) in a search space, which is comprised of CCEs corresponding to a plurality of downlink control channel candidates to be attempted to be decoded;
   the resource index of the uplink control channel is decided based on the CCE(s), to which the downlink control channel is allocated, is comprised of CCEs that are defined by starting on a CCE with a CCE number, which depends on both a total number of CCEs in a subframe and the aggregation size; and at least part of the search space for the aggregation size is comprised of CCEs with consecutive CCE numbers.

* * * * *

UNITED STATES PATENT AND TRADEMARK OFFICE
CERTIFICATE OF CORRECTION

| | |
|---|---|
| PATENT NO. | : 8,526,376 B2 |
| APPLICATION NO. | : 12/739687 |
| DATED | : September 3, 2013 |
| INVENTOR(S) | : Seigo Nakao et al. |

It is certified that error appears in the above-identified patent and that said Letters Patent is hereby corrected as shown below:

On the Title Page:

Item (56) References Cited, Other Publications, page 2, column 2, line 12, incorrectly reads:

"Search Space," Oct. 8, 2007, pp. 1-4. p. 3, line 5."

and should read:

"Search Space," Oct. 8, 2007, pp. 1-4.".

Item (56) References Cited, Other Publications, page 2, column 2, line 15, incorrectly reads:

"nal," Aug. 20, 2007, pp. 1-2. p. 3, line 8."

and should read:

"nal," Aug. 20, 2007, pp. 1-2.".

In the Claims:

Claim 16, column 22, line 21, incorrectly reads:

"channel is allocated, is comprised of CCEs that are"

and should read:

"channel is allocated; and
        the search space for each aggregation size corresponding to a number of the CCE(s), to which the downlink control channel is allocated, is comprised of CCEs that are".

Signed and Sealed this
Eleventh Day of March, 2014

Michelle K. Lee
*Deputy Director of the United States Patent and Trademark Office*